US011249707B2

United States Patent
Kikuchi

(10) Patent No.: US 11,249,707 B2
(45) Date of Patent: Feb. 15, 2022

(54) INFORMATION PROCESSING APPARATUS THAT GENERATES A MESSAGE, PRINTING SYSTEM, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Hiroshi Kikuchi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/150,412

(22) Filed: Jan. 15, 2021

(65) Prior Publication Data

US 2021/0224009 A1   Jul. 22, 2021

(30) Foreign Application Priority Data

Jan. 21, 2020   (JP) .............................. JP2020-007358

(51) Int. Cl.
*G06F 3/12*      (2006.01)
*H04L 12/58*    (2006.01)

(52) U.S. Cl.
CPC .......... *G06F 3/1293* (2013.01); *G06F 3/1205* (2013.01); *G06F 3/1232* (2013.01); *G06F 3/1256* (2013.01); *H04L 51/02* (2013.01); *H04L 51/046* (2013.01)

(58) Field of Classification Search
CPC .... G06F 3/1207; G06F 3/1288; G06F 3/1292; G06F 3/0412; G06F 3/0488; G06F 3/1204; G06F 3/1208; G06F 3/122; G06F 3/1228; G06F 3/1237; G06F 3/1253
See application file for complete search history.

(56) References Cited

U.S. PATENT DOCUMENTS

| 9,940,083 B2 * | 4/2018 | Shimomoto | ....... H04N 1/00244 |
| 2014/0132978 A1 * | 5/2014 | Igawa | .................... G06F 3/1256 |
| | | | 358/1.14 |
| 2014/0201759 A1 * | 7/2014 | Amikura | ............... G06F 3/1213 |
| | | | 718/106 |
| 2015/0339017 A1 * | 11/2015 | Watanabe | ............. G06F 3/0484 |
| | | | 715/780 |
| 2019/0250864 A1 * | 8/2019 | Sugai | .................... H04N 1/0044 |
| 2019/0258431 A1 * | 8/2019 | Yamamoto | ............ G06F 3/1222 |
| 2020/0099642 A1 * | 3/2020 | Mishima | ................. G06F 3/126 |
| 2020/0099799 A1 * | 3/2020 | Obayashi | ................ H04L 51/18 |
| 2020/0280641 A1 * | 9/2020 | Hiramatsu | ............ G06F 3/1206 |
| 2020/0344375 A1 * | 10/2020 | Ishii | ....................... G06F 3/1228 |
| 2021/0055897 A1 * | 2/2021 | Tomihisa | ................ G06F 3/126 |

FOREIGN PATENT DOCUMENTS

JP        2019144698 A        8/2019

* cited by examiner

*Primary Examiner* — Henok Shiferaw
(74) *Attorney, Agent, or Firm* — Rossi, Kimms & McDowell LLP

(57) ABSTRACT

A bot service in cooperation with a messaging service generates, in response to upload of a messaging service file from a messaging application, a message including a control used for specifying a print setting of the file and a preview image corresponding to a print setting specified by the control and submits the message to the messaging service. Further, in response to a print instruction for the file received from a messaging service, the bot service instructs a print service to print the file using a print setting specified by the control.

21 Claims, 24 Drawing Sheets

FIG. 18

```
{
  "channel": "Channel_A",
  "blocks": [
    {
      "type": "section",
      "text": {
        "type": "mrkdwn",
        "text": "Print?"
      }
    },
    {
      "type": "actions",
      "elements": [
        {
          "type": "button",
          "text": {
            "type": "plain_text",
            "text": "Yes"
          },
          "value": "yes"
        }
      ]
    }
  ]
}
```

FIG. 19

```
{
  "channel": "Channel_A",
  "blocks": [
    {
      "type": "section",
      "text": {
        "type": "mrkdwn",
        "text": " Select print setting and press print button "
      },
      "accessory": {
        "type": "image",
        "image_url": "https://hoge.jp/hoge.jpg",
        "alt_text": "preview"
      }
    },
    {
      "type": "actions",
      "elements": [
        {
          "type": "static_select",
          "options": [
            {
              "text": {
                "type": "plain_text",
                "text": " Single side "
              },
              "value": "simplex"
            },
            {
              "text": {
                "type": "plain_text",
                "text": " Double side "
              },
              "value": "duplex"
            }
          ]
        },
        {
          "type": "button",
          "text": {
            "type": "plain_text",
            "text": " Print "
          },
          "value": "print"
        }
      ]
    }
  ]
}
```

FIG. 24

```
{
  "channel": "Channel_A",
  "blocks": [
    {
      "type": "section",
      "text": {
        "type": "mrkdwn",
        "text": " Select print setting and press print button "
      }
    },
    {
      "type": "context",
      "elements": [
        {
          "type": "image",
          "image_url": "https://hoge.jp/preview1.jpg",
          "alt_text": "preview1"
        }
        {
          "type": "actions",
          "elements": [
            {
              "type": "button",
              "text": {
                "type": "plain_text",
                "text": " Print "
              },
              "value": "print1"
            }
          ]
        }
      ]
    },
    {
      "type": "context",
      "elements": [
        {
          "type": "image",
          "image_url": "https://hoge.jp/preview2.jpg",
          "alt_text": "preview2"
        }
        {
          "type": "actions",
          "elements": [
            {
              "type": "button",
              "text": {
                "type": "plain_text",
                "text": " Print "
              },
              "value": "print2"
            }
          ]
        }
      ]
    }
  ]
}
```

INFORMATION PROCESSING APPARATUS THAT GENERATES A MESSAGE, PRINTING SYSTEM, CONTROL METHOD FOR INFORMATION PROCESSING APPARATUS, AND STORAGE MEDIUM

BACKGROUND OF THE INVENTION

Field of the Invention

The present invention relates to an information processing apparatus in cooperation with a messaging service, a printing system, a control method for the information processing apparatus, and a storage medium.

Description of the Related Art

Massaging applications for so-called business chats to transfer messages among a plurality of user terminals via a network have been widely used. In recent years, services using a so-called bot to automatically respond with a message in accordance with the content of a message sent on a messaging application from a user in such a messaging application have increased. On the other hand, with the spread of cloud services, printing devices have a network communication function, and cloud print services by which a user provides a print instruction from a terminal via a network are provided.

Cooperation between the cloud print service and the bot service described above enables a user to provide a print instruction from a messaging application on a terminal to a printing device in a form of interaction with the bot service.

Japanese Patent Application Laid-Open No. 2019-144698 discloses a method of performing printing at a printing device by instructing a virtual user, to which a bot service responds, to print an image file uploaded on a messaging application. It is also possible to specify a print setting at printing through input to the bot service via a web browser in a form of interaction.

In the technology of Japanese Patent Application Laid-Open No. 2019-144698, however, the user is unable to confirm on the messaging application in advance what format will be obtained when the print is actually output in the specified print setting, and there is a problem of poor convenience. If a material printed on paper differs from a print result intended by a user, the user has to perform the printing again, which is troublesome.

The present invention has been made to solve the problem described above. The present invention intends to provide a mechanism that enables a user to confirm a format of an output result on a messaging application in advance before providing a print instruction and can reduce occurrence of printing in an unintended format.

SUMMARY OF THE INVENTION

The present invention is an information processing apparatus in cooperation with a messaging service that controls transfer of a message with a messaging application operating on a client terminal, and the information processing apparatus includes: a generation unit that generates a message including a control for specifying a print setting of a file submitted from the messaging application to the messaging service and a preview image corresponding to a print setting specified by the control; a submission unit that submits the message generated by the generation unit to the messaging service; and a control unit that controls printing of the file using the print setting specified by the control in response to a print instruction for the file received from the messaging service.

Further features of the present invention will become apparent from the following description of exemplary embodiments with reference to the attached drawings.

BRIEF DESCRIPTION OF THE DRAWINGS

FIG. 18 is a diagram illustrating a message generated by the bot service.

FIG. 19 is a diagram illustrating a message generated by the bot service.

FIG. 24 is a diagram illustrating a message generated by the bot service in the second embodiment.

DESCRIPTION OF THE EMBODIMENTS

Embodiments for implementing the present invention will be described below with reference to the drawings.

First Embodiment

Figure 1:
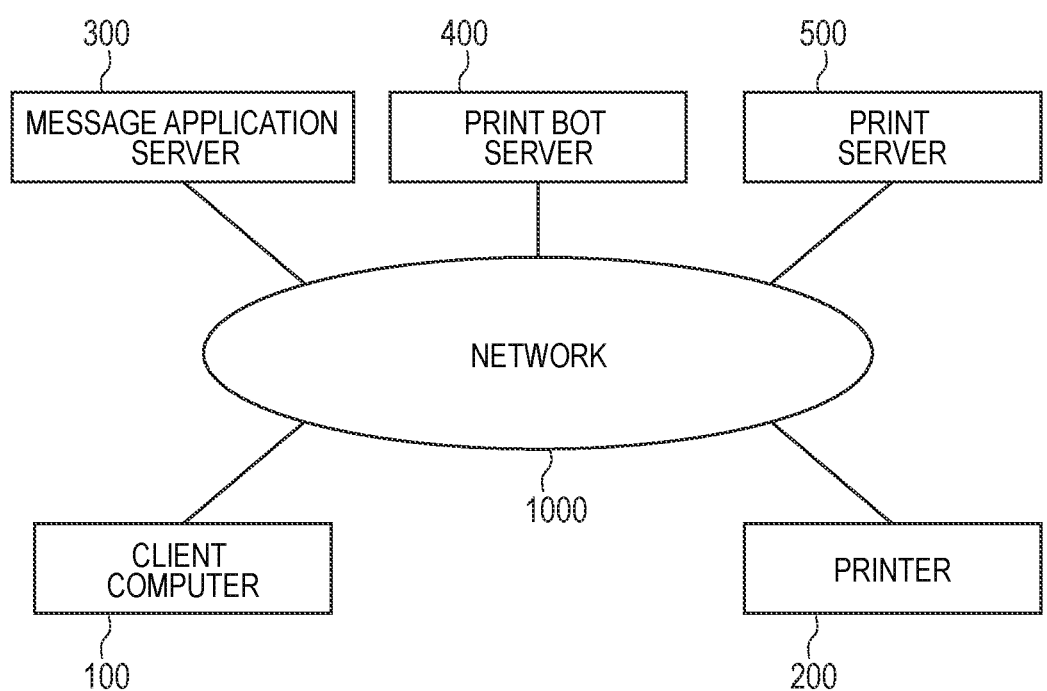
FIG. 1 is a diagram illustrating an example of a configuration of a network system of the present embodiment.

FIG. 1 is a diagram illustrating an example of a configuration of a network system illustrating one embodiment of the present invention. As illustrated in FIG. 1, in the system of the present embodiment, a client computer 100, a printer 200, a message application server 30, a print bot server 400, a print server 500, and the like are connected to each other via a network 1000.

Although only one client computer 100 and one printer 20 are illustrated in the example illustrated in FIG. 1, there are typically a plurality of client computers 100 and a plurality of printers 200 in the actual implementation. Each server may be configured to distribute the load over a plurality of servers. In contrast, a single server may be configured to virtually serve as each server internally in a physical sense. Although a WAN such as the Internet is expected for the network 1000, a closed environment such as an intranet LAN may be employed. Further, the network 1000 may be a wired network or a wireless network.

The client computer 100 refers to a personal computer (PC), a tablet type computer, a smartphone, or the like and is a client terminal directly operated by a user. Any application software can be executed on the client computer 100. The printer 200 is a device that actually performs printing on a physical sheet, which converts print data received from the network 1000 into image data and prints the image data.

The message application server 300 always activates a messaging service 311 illustrated in FIG. 5A described later and provides a network service such as a business chat to the client computer 100. In the client computer 100, it is possible to use a messaging application 111 illustrated in FIG. 4 described later to utilize a messaging service provided by the message application server 300.

The print bot server 400 always activates a bot service 411 illustrated in FIG. 5B described later and is registered as a virtual user to perform message transmission or the like to the messaging service 311 provided by the message application server 300.

The print server 500 always activates a print service 511 illustrated in FIG. 5C described later and has functions of externally accepting a print instruction, transmitting print data to a predetermined printer 200, and providing a print instruction. When arranged in a cloud environment, the print server 500 may be referred to as a cloud server. With respect to a timing to instruct the printer 200 to perform printing, a push type system in which the user is not required to perform any operation on the printer 200 may be employed, or a pull type system in which the user performs some operation to start printing on the printer 200 and the printing then starts may be employed. Note that the function of the print server 500 may be provided in the print bot server 400.

Figure 2A:
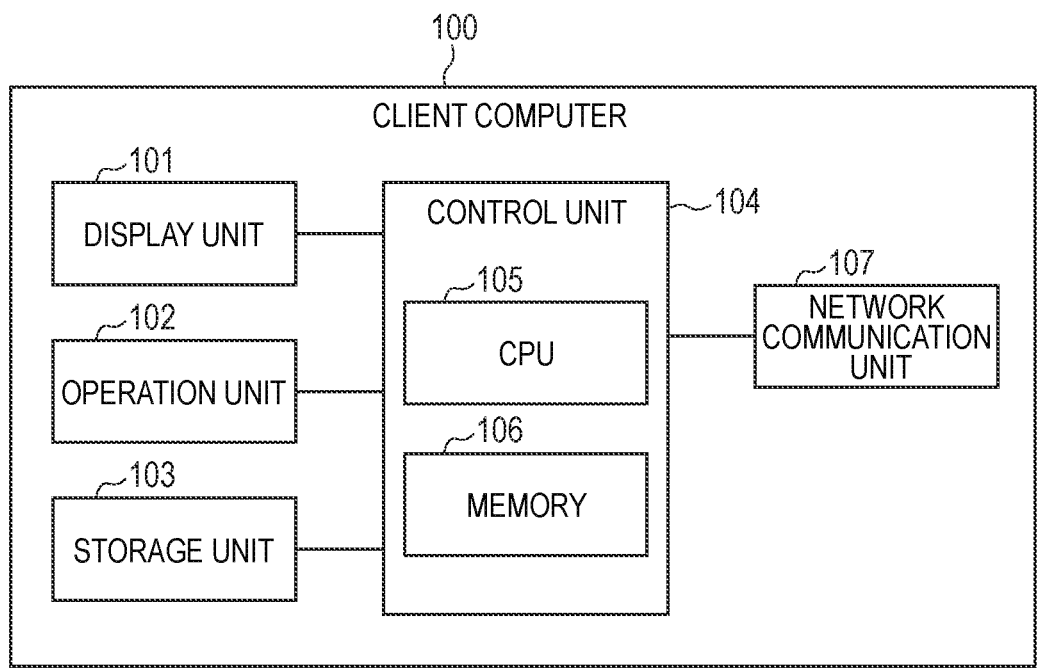
FIG. 2A is a hardware configuration diagram of a client computer.

Next, the hardware configurations of respective devices in the system of the present embodiment will be described with reference to FIG. 2A, FIG. 2B, and FIG. 3A to FIG. 3C. FIG. 2A is a block diagram illustrating an example of a hardware configuration of the client computer 100. The client computer 100 has a display unit 101, an operation unit 102, a storage unit 103, a control unit 104, and a network communication unit 107.

The display unit 101 is a device such as a liquid crystal display that displays visual information to the user in real time. The operation unit 102 is a device that accepts input from the user via a keyboard, a mouse, or the like. A device such as a touch panel having both functions of the display unit 101 and the operation unit 102 may be used. The storage unit 103 refers to a nonvolatile storage device such as a hard disk, a solid state drive (SSD), or the like and can store and rewrite digital data.

The control unit 104 is the central part that controls the overall operation of the client computer 100 and has a CPU 105, a memory 106, and the like. The CPU 105 loads a program stored in the storage unit 103 into the memory 106 and executes the program to perform an input event process from the operation unit 102, an output process to the display unit 101, or the like. The memory 106 is a main storage memory of the CPU 105 and is used as a work area or a temporary storage area into which various programs are loaded. The network communication unit 107 is a device that communicates with the external network 1000 and performs input/output digital data with an external server or the like via the network 1000.

Figure 2B:
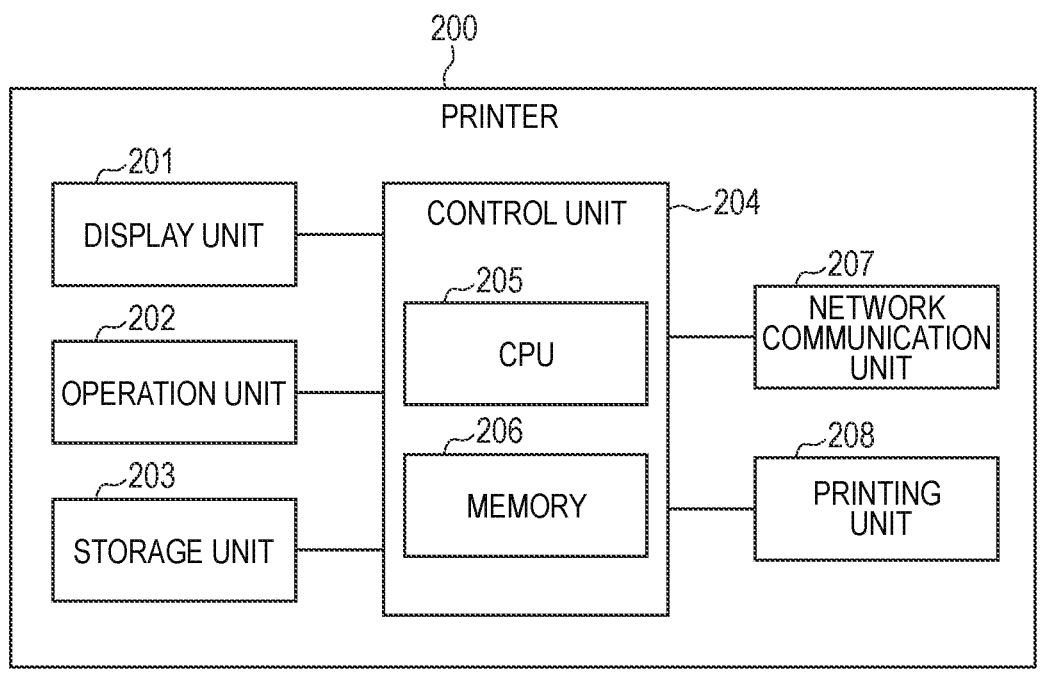
FIG. 2B is a hardware configuration diagram of a printer.

FIG. 2B is a block diagram illustrating an example of the hardware configuration of the printer 200. The printer 200 has a display unit 201, an operation unit 202, a storage unit 203, a control unit 204, a network communication unit 207, and a printing unit 208.

The display unit 201 is a device that displays information to the user in real time, such as a touch panel or an LED attached to the printer 200. The operation unit 202 is a device that accepts input from the user and may include a hard key such as number keys in addition to the touch panel. Since the storage unit 203 and the control unit 204 are the same as those of the client computer 100, the description thereof will be omitted.

The network communication unit 207 is a device that communicates with the external network 1000 and has functions of mainly receiving print data and transmitting information on the status of the printer 200, such as an error, to an external server or the like. The printing unit 208 is a device that performs a print process by performing a series of operations of paper feed, printing, and paper discharge on the sheet prepared in a cassette or a tray. The printing scheme may be an electrophotographic system, an ink-jet system, or the like and not particularly limited. A double-side unit or a finishing device for a staple process, a punch process, or the like used in paper discharge are also included in the printing unit 208. Note that, although a single-function printer that performs only the print function is described as an example of the printer 200 in the present embodiment, a multi-function printer (multi-function machine) additionally having a scanner function or a FAX function may be used.

Figure 3A:
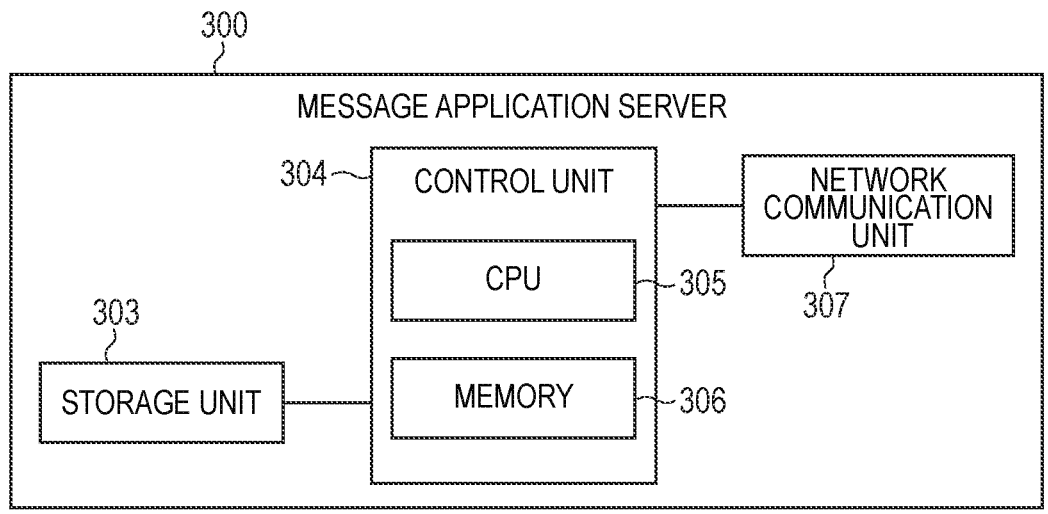
FIG. 3A is a hardware configuration diagram of a message application server.

FIG. 3A is a block diagram illustrating an example of a hardware configuration of the message application server 300. The message application server 300 has a storage unit 303, a control unit 304, and a network communication unit 307. The description of respective components is the same as that for the client computer 100 and thus will be omitted.

Figure 3B:
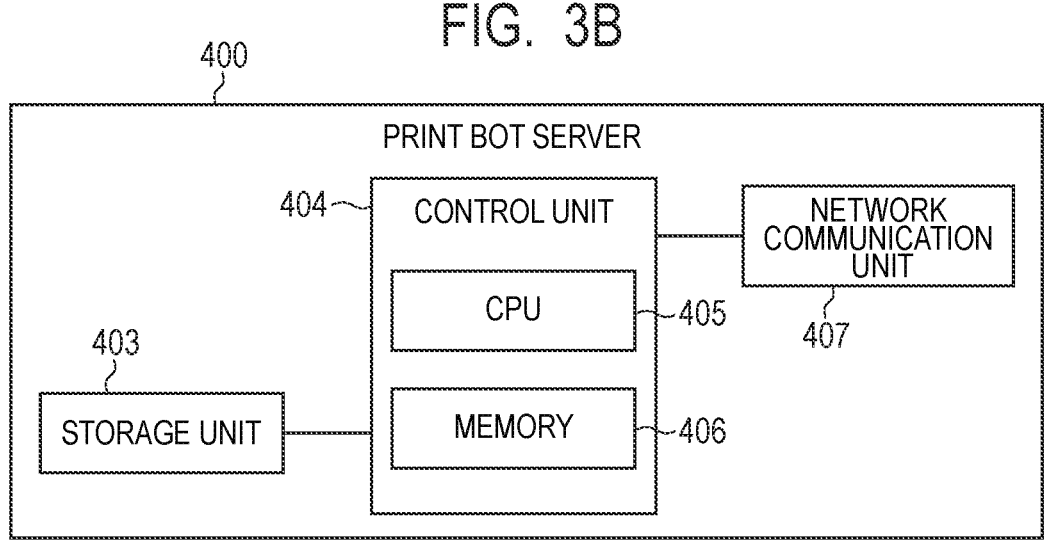
FIG. 3B is a hardware configuration diagram of a print bot server.

FIG. 3B is a block diagram illustrating an example of the hardware configuration of the print bot server 400. The print bot server 400 has a storage unit 403, a control unit 404, and a network communication unit 407. Each description of these components will be omitted for the same reason as above.

Figure 3C:
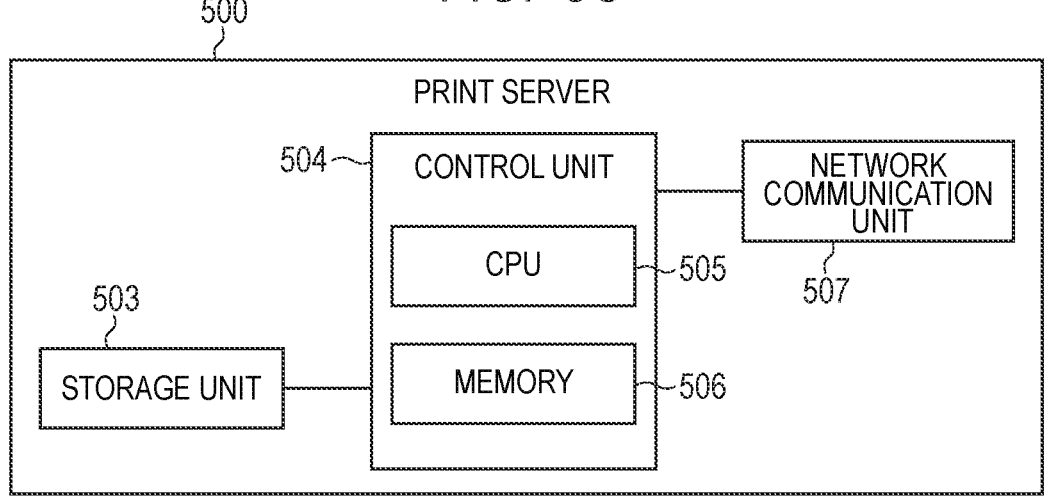
FIG. 3C is a hardware configuration diagram of a print server.

FIG. 3C is a block diagram illustrating an example of the hardware configuration of the print server 500. The print server 500 has a storage unit 503, a control unit 504, and a network communication unit 507. Each description of these components will be omitted for the same reason as above. Note that the message application server 300, the print bot server 400, and the print server 500 can be formed of a general information processing apparatus but may be configured to be implemented with a use of a cloud service or the like.

Next, the software configuration in respective devices in the system of the present embodiment will be described with reference to FIG. 4 and FIG. 5A to FIG. 5C.

Figure 4:
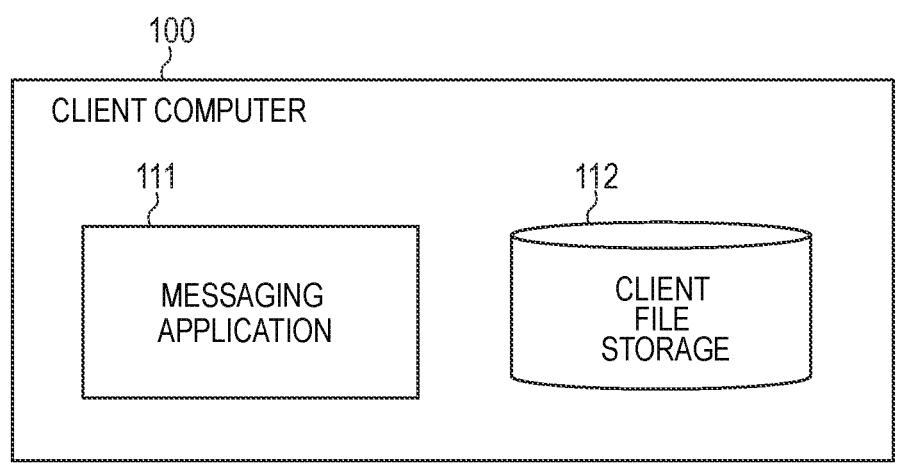
FIG. 4 is a software configuration diagram of the client computer.

FIG. 4 is a block diagram illustrating an example of the software configuration of the client computer 100. The messaging application 111 is a software application that serves as an interface with the user in a network service such as a business chat. Specifically, the messaging application 111 accepts message input via the operation unit 102 performed by the user and transmits the message to the message application server 300. Further, the messaging application 111 accepts a file upload instruction provided by the user and transmits the file to the message application server 300.

Further, when message input is performed by another user, the messaging application 111 displays the message on the display unit 101 in real time in response to a notification from the message application server 300. The type of the message may be a UI control such as a button, a combo box, or the like transmitted by the print bot server 400 or the like, in addition to a general character string or image. Transmission of predetermined action information to the message application server 300 in response to the user operation performed on the UI control is also a function of the messaging application 111.

A client file storage 112 is an area prepared in the storage unit 103 of the client computer 100 and used for storing user files, and the user may store therein any file including a file created by using another application (not illustrated). The messaging service 311 is authorized to access the client file storage 112.

Figure 5A:
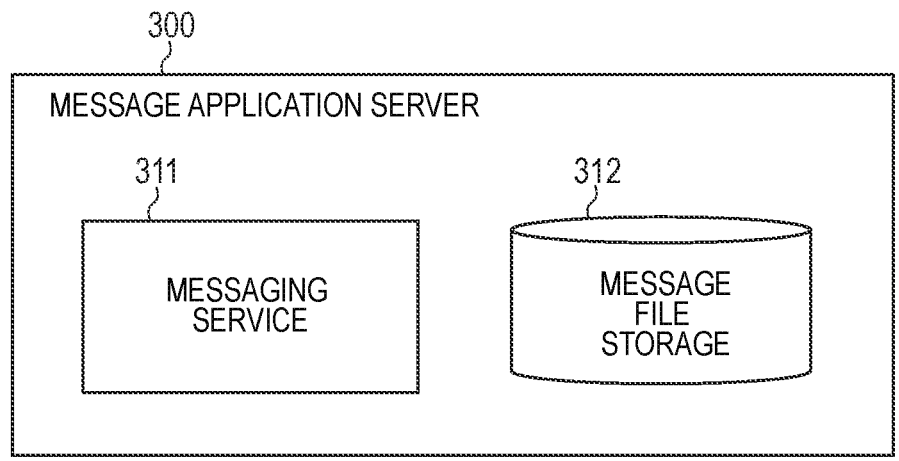
FIG. 5A is a software configuration diagram of the message application server.

FIG. 5A is a block diagram illustrating an example of the software configuration of the message application server 300. The messaging service 311 is a software application that provides a network service such as a business chat. The messaging service 311 transfers information with a plurality of client computers 100 or the print bot server 400 connected to the network 1000. The messaging service 311 performs user management and transfers information with only a user or a bot registered in advance. Accordingly, confidential information or the like can also be shared by the messaging service 311. In the present embodiment, such a registered user or bot is referred to as a member.

The messaging service 311 transmits a message received from a member to another targeted member in real time. Further, the messaging service 311 stores a file received from a member in a message file storage 312 and notifies another targeted member. Once receiving action information described above, the messaging service 311 transmits the information to a preregistered server (for example, the print bot server 400) or the like.

The message file storage 312 is an area prepared in the storage unit 303 of the message application server 300. Member information managed by the messaging service 311 or various messages or files received from the member are stored in the message file storage 312 and used by the messaging service 311.

Figure 5B:
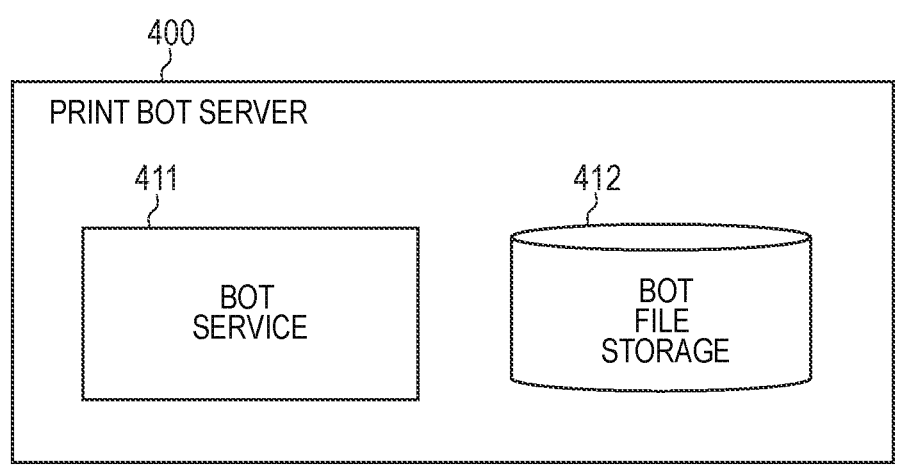
FIG. 5B is a software configuration diagram of the print bot server.

FIG. 5B is a diagram illustrating an example of the software configuration of the print bot server 400. The bot service 411 receives a message or the like from the messaging service 311 of the message application server 300 and performs a process in accordance with the content thereof. Specifically, the bot service 411 transmits a message that enables input of a print setting to the message application server 300 in cooperation with the print server 500 in response to a print request from the user or provides a print instruction to the print server 500 in response to a print instruction. That is, the print bot server 400 is configured to be able to cooperate with the messaging service 311 illustrated in FIG. 5A and the print server 500 illustrated in FIG. 5C described later.

A bot file storage 412 is an area prepared in the storage unit 403 of the print bot server 400. In the bot file storage 412, a print setting, a preview image, or the like used when the bot service 411 creates a message are stored, which may be used by the bot service 411.

Figure 5C:
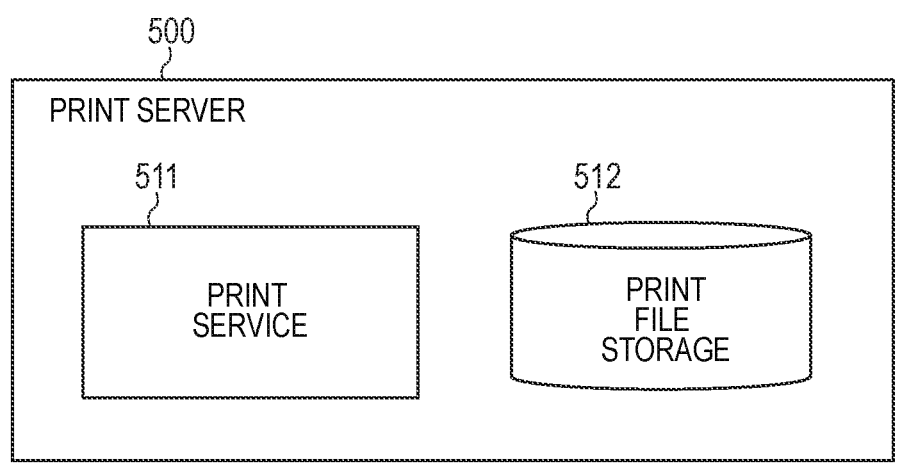
FIG. 5C is a software configuration diagram of the print server.

FIG. 5C is a diagram illustrating an example of the software configuration of the print server 500. The print service 511 is a service that transmits externally received print data to a registered printer (for example, the printer 200) via the network 1000 and causes the registered printer to execute the print data.

A print file storage 512 is an area prepared in the storage unit 503 of the print server 500. In the print file storage 512, user information registered in the print service 511, information on a printer possessed by each user, a default print setting for each user, a list of print settings, or the like are stored, which may be used in the print service 511.

Next, the user interface of the messaging application 111 on the client computer 100 in the first embodiment will be described with reference to FIG. 6 to FIG. 8. Note that, since a user registration method or a login method to the messaging service 311 using the messaging application 111 is well known, the description thereof will be omitted here.

Figure 6:
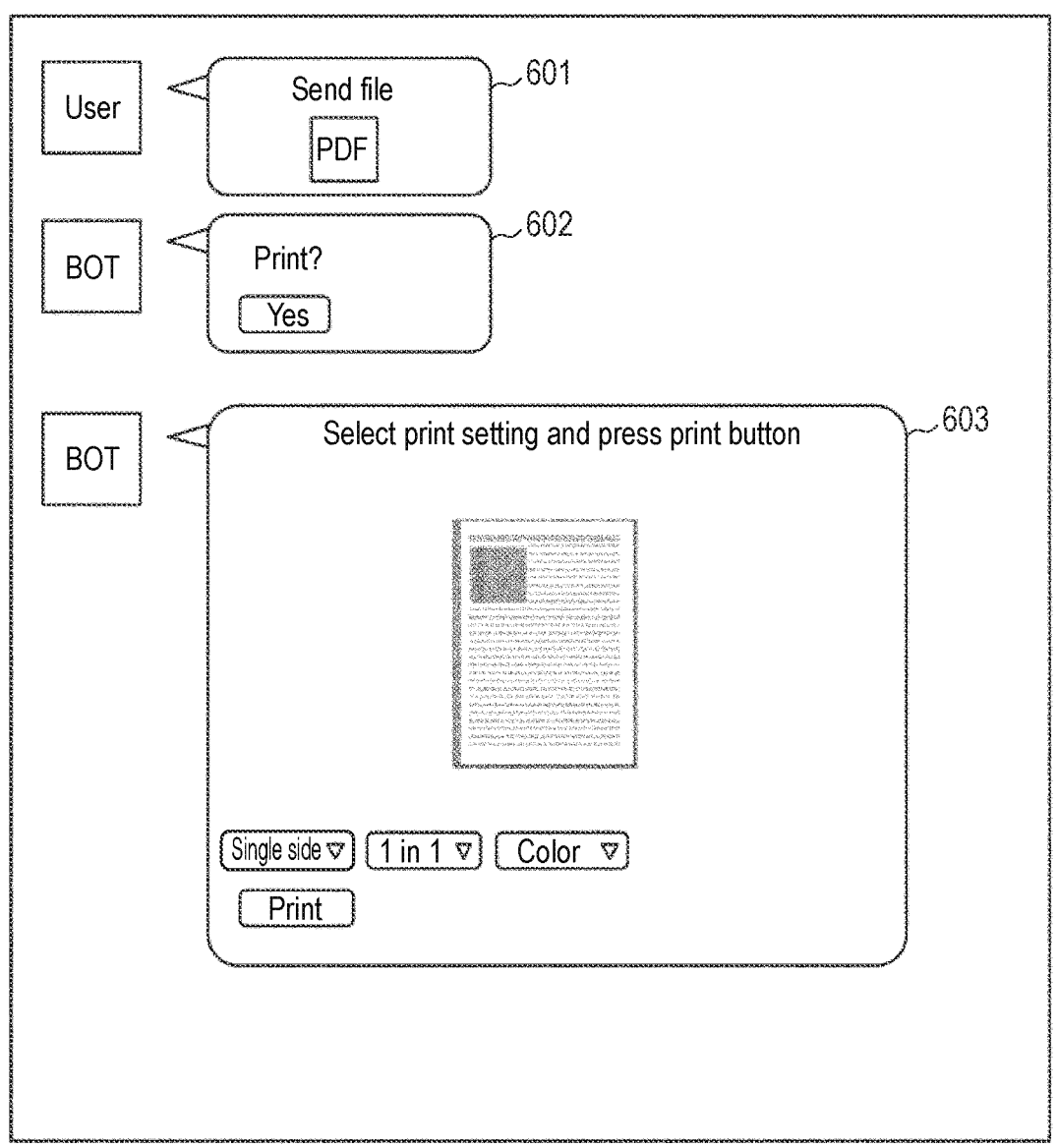
FIG. 6 is a diagram illustrating a user interface of a messaging application.

FIG. 6 is a diagram illustrating a user interface when the user uses the messaging application 111 to print some file (herein, a PDF file as an example), for example.

First, the user selects an intended file to be printed from the client file storage 112 and transmits the file to the message application server 300 (601). In response, the bot service 411 then transmits a message "Print?" (602).

Once a "Yes" button is pressed by the user, the bot service 411 subsequently transmits a message "Select print setting and push print button" (603). In a message 603, a preview image indicating a format of a print result, a combo box group for print settings that can be changed, and a UI control such as the "Print" button are arranged. The user is able to specify any print settings by using the combo boxes.

Figure 7:
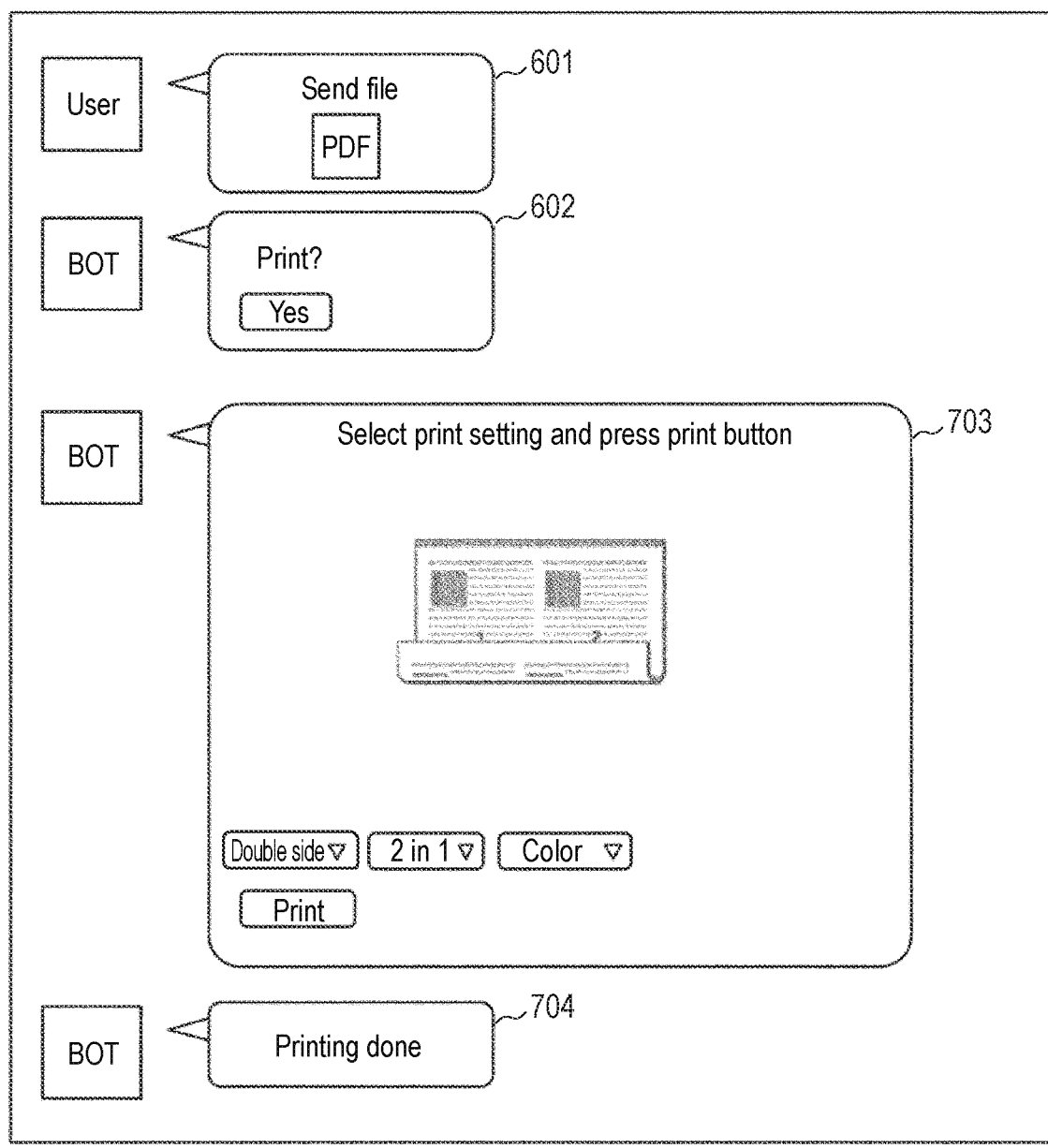
FIG. 7 is a diagram illustrating a user interface of the messaging application.

FIG. 7 is a diagram illustrating a user interface of the messaging application 111 when user changes the print setting on the message 603 of FIG. 6 to the setting of double side and 2 in 1, for example.

The preview image displayed in the message 603 is replaced with a preview image in accordance with the changed print setting as illustrated in a message 703. This enables the user to visually recognize, prior to printing, the format to be obtained after the printing. Herein, when the "Print" button of the message 703 is pressed by the user, printing is performed by the printer 200 in the print setting as specified in the message 703. A message "Printing complete" is transmitted as a print completion notification from the bot service 411 that completed the print instruction and displayed on the messaging application 111 (704).

Figure 8:
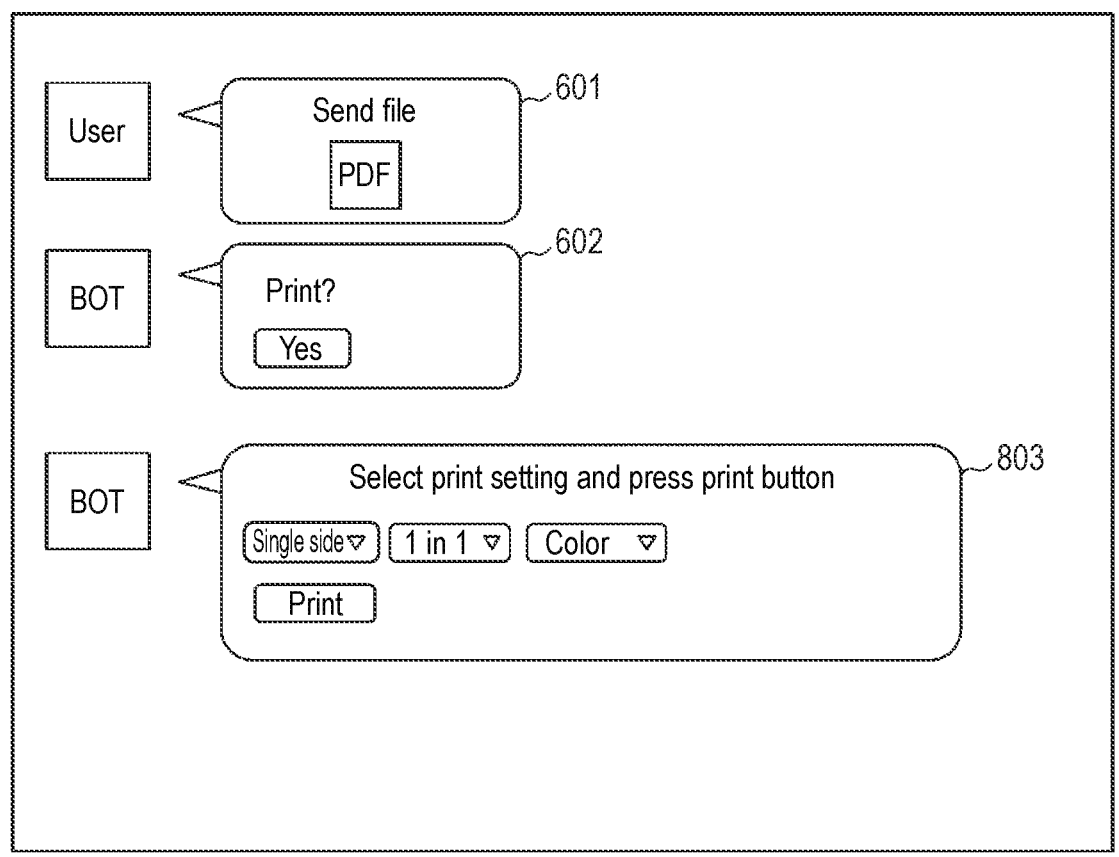
FIG. 8 is a diagram illustrating a user interface of the messaging application.

FIG. 8 is a diagram illustrating a user interface of the messaging application 111 when a different form from the present embodiment is taken, for example. The difference from FIG. 6 is in that no preview image is illustrated in a message 803 used for changing a print setting received from the bot service 411.

Herein, when the user changed some print setting, a message is updated with a preview image attached in accordance with the changed print setting as illustrated in FIG. 7. In such a way, for a user who does not change the print setting, it is possible to prevent the preview image display from occupying the display area of the business chat by not displaying a preview image initially and displaying a preview image in the message only when a print setting was changed. Further, no preview is displayed when the current print setting matches the default print setting, and a preview is displayed only when the current print setting does not match the default print setting.

Figure 9:
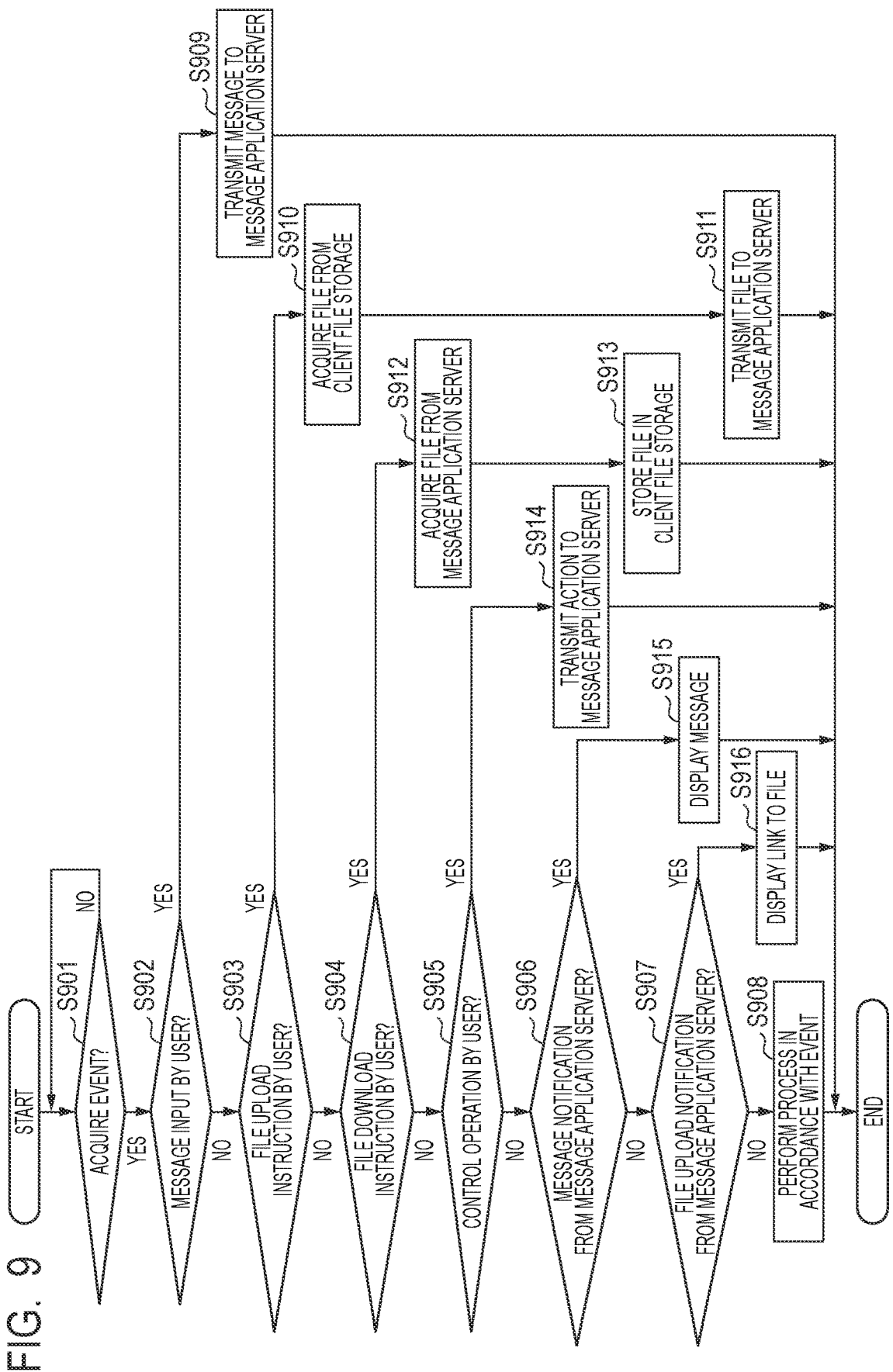
FIG. 9 is a flowchart illustrating a process of the messaging application.

Next, the process of applications or services in the present embodiment will be described with reference to FIG. 9 to FIG. 17. FIG. 9 is a flowchart of the process performed by the messaging application 111 on the client computer 100. The entire process illustrated in FIG. 9 is performed when a program of the messaging application 111 stored in the storage unit 103 of the client computer 100 is loaded into the memory 106 and executed by the CPU 105. In the following, the process performed by the CPU 105 based on the program of the messaging application 111 will be described as the messaging application 111 being a subject of execution.

First, the messaging application 111 monitors acquisition of an event (S901) and, in response to acquiring an event (S901, Yes), proceeds with the process to S902.

In S902, the messaging application 111 checks whether or not the event is message input made by a user. If the event is message input made by the user (902, Yes), the messaging application 111 proceeds with the process to S909. In S909, the messaging application 111 transmits the input message to the message application server 300 (S909).

On the other hand, if the event is not message input made by the user (S902, No), the messaging application 111 proceeds with the process to S903.

In S903, the messaging application 111 checks whether or not the event is a file upload instruction provided by the user. If the event is a file upload instruction provided by the user (S903, Yes), the messaging application 111 proceeds with the process to S910. In S910, the messaging application 111 acquires the specified file from the client file storage 112. Then, in S911, the messaging application 111 transmits the file acquired in S910 described above to the message application server 300.

On the other hand, if the event is not a file upload instruction provided by the user (S903, No), the messaging application 111 proceeds with the process to S904.

In S904, the messaging application 111 checks whether or not the event is a file download instruction provided by the user. If the event is a file download instruction provided by the user (S904, Yes), the messaging application 111 proceeds with the process to S912. In S912, the messaging application 111 acquires the file specified by the user from the message application server 300. Then, in S913, the messaging application 111 stores the file acquired in S912 described above in the client file storage 112.

On the other hand, If the event is not a file download instruction provided by the user (S904, No), the messaging application 111 proceeds with the process to S905.

In S905, the messaging application 111 checks whether or not the event is a control operation performed by the user. Herein, the control operation is the event generated when the user presses and selects a combo box such as a "Yes" button in the message 602, "Single side" in the message 603, or the like of FIG. 6. If the event is a control operation performed by the user (S905, Yes), the messaging application 111 proceeds with the process to S914. In S914, the messaging application 111 transmits an action corresponding to the operated control to the message application server 300.

On the other hand, If the event is not a control operation performed by the user (S905, No), the messaging application 111 proceeds with the process to S906.

In S906, the messaging application 111 checks whether or not the event is a message notification from the message application server 300. In response to message transmission from a member, the message application server 300 provides a message notification to all the targeted members. Thus, the notification will be delivered also to the client computer 100. If the event is a message notification from the message application server 300 (S906, Yes), the messaging application 111 proceeds with the process to S915. In S915, the messaging application 111 arranges and displays the notified message in a layout with better visibility for the user. For some types of messages, not only a character string but also a UI control such as a button may be included in the message (for example, 602 or 603 of FIG. 6).

On the other hand, If the event is not a message notification (S906, No), the messaging application 111 proceeds with the process to S907.

In S907, the messaging application 111 checks whether or not the event is a file upload notification from the message application server 300. If the event is a file upload notification from the message application server 300 (S907, Yes), the messaging application 111 proceeds with the process to S916. Note that the file upload notification includes information on a link to the uploaded file. In S916, the messaging application 111 displays a message indicating that a file has been uploaded and displays a link to the file. This enables any member to press the link to download the file uploaded by another member and stored in the message file storage 312.

On the other hand, If the event is not a file upload notification from the message application server 300 (S907, No), the messaging application 111 proceeds with the process to S908. In S908, the messaging application 111 performs a process in accordance with the event, and the description thereof will be omitted here.

Figure 10:
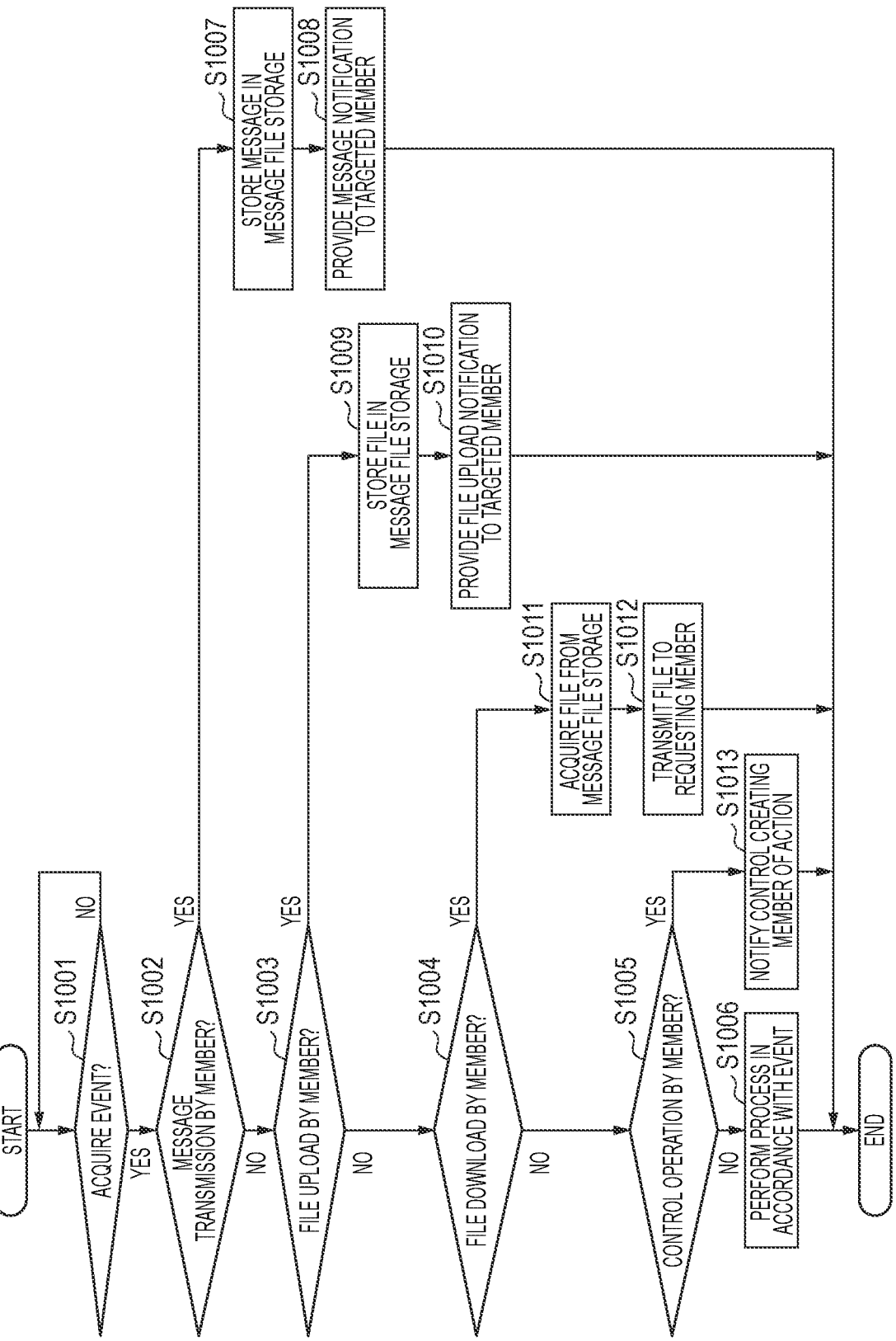
FIG. 10 is a flowchart illustrating a process of a messaging service.

FIG. 10 is a flowchart of the process performed by the messaging service 311 on the message application server 300. The process illustrated in FIG. 10 is performed when a program of the messaging service 311 stored in the storage unit 303 of the message application server 300 is loaded into the memory 306 and executed by the CPU 305. In the following, the process performed by the CPU 305 based on the program of the messaging service 311 will be described as the messaging service 311 being a subject of execution.

First, the messaging service 311 monitors acquisition of an event (S1001) and, in response to acquiring an event (S1001, Yes), proceeds with the process to S1002.

In S1002, the messaging service 311 checks whether or not the event is message transmission made by a member. The member as used herein may be a user or may be a bot as described above. If the event is message transmission made by a member (S1002, Yes), the messaging service 311 proceeds with the process to S1007. In S1007, the messaging service 311 stores the received message in the message file storage 312. Then, in S1008, the messaging service 311 notifies one or more targeted members of the message. The targeted member may be all the registered members or may be an individual member when the message is transmitted individually to one member.

On the other hand, if the event is not message transmission made by a member (S1002, No), the messaging service 311 proceeds with the process to S1003.

In S1003, the messaging service 311 checks whether or not the event is file upload performed by a member. If the event is file upload performed by a member (S1003, Yes), the messaging service 311 proceeds with the process to S1009. In S1009, the messaging service 311 stores the received file in the message file storage 312. Then, in S1010, the messaging service 311 provides a file upload notification to the targeted member. In this step, the messaging service 311 includes information on a link to the uploaded file in the file upload notification.

On the other hand, if the event is not file upload performed by a member (S1003, No), the messaging service 311 proceeds with the process to S1004.

In S1004, the messaging service 311 checks whether or not the event is file download performed by a member. If the event is file download performed by a member (S1004, Yes), the messaging service 311 proceeds with the process to S1011. In S1011, the messaging service 311 acquires the specified file from the message file storage 312. Then, in S1012, the messaging service 311 transmits the acquired file to the requesting member.

On the other hand, if the event is not file download performed by a member (S1004, No), the messaging service 311 proceeds with the process to S1005.

In S1005, the messaging service 311 checks whether or not the event is a control operation performed by a member. If the event is a control operation performed by a member (S1005, Yes), the messaging service 311 proceeds with the process to S1013. In S1013, the messaging service 311 notifies, of an action, the member that has created the operated control. The action is information transmitted from the messaging application 111 and includes pressing of a button, selection of a combo box, or the like.

On the other hand, if the event is not a control operation performed by a member (S1005, No), the messaging service 311 proceeds with the process to S1006. In S1006, the messaging service 311 performs a process in accordance with the event, and the description thereof will be omitted here.

Next, the process performed by the bot service 411 will be described. FIG. 11 to FIG. 14 are diagrams illustrating flowcharts of the processes performed by the bot service 411 on the print bot server 400. The processes illustrated in FIG. 11 to FIG. 14 are performed when a program of the bot service 411 stored in the storage unit 403 of the print bot server 400 is loaded into the memory 406 and executed by the CPU 405. In the following, the process performed by the CPU 405 based on the program of the bot service 411 will be described as the bot service 411 being a subject of execution.

First, the flowchart of FIG. 11 will be described. The bot service 411 also monitors acquisition of an event in the same manner as the messaging application 111 and, in response to receiving an event, checks whether or not the event is a file upload notification from the message application server 300 (S1101). If the event is a file upload notification from the message application server 300 (S1101, Yes), the bot service 411 proceeds with the process to S102. Note that the file upload notification includes information on a link to the uploaded file.

In S1102, the bot service 411 generates a message including a character string of "Print?" and a button of "Yes". Note that information on a link to a file corresponding to the generated message may be included. Then, in S1103, the bot service 411 transmits the message generated in S1102 described above to the message application server 300. In this step, the bot service 411 stores an identifier of the transmitted message and the information on the link to the uploaded file described above in the bot file storage 412 in association with each other. The bot service 411 then returns to a standby state for a next event.

With the process described above, a message including a character string of "Print?" and a button of "Yes" is submitted to a messaging service, and a user's intention of printing is ready to be accepted. Therefore, the user is able to inform the bot service 411 of its intention of printing by only uploading a file without searching for a user interface used for the printing.

Next, the flowchart of FIG. 12 will be described. In response to receiving an event, the bot service 411 checks whether or not the event is a "Yes" button press notification from the message application server 300 (S1201). If the event is a "Yes" button press notification (S1201, Yes), the bot service 411 proceeds with the process to S1202. Note that the "Yes" button press notification includes information that identifies the user who pressed the "Yes" button and an identifier of a message including the pressed "Yes" button.

In S1202, the bot service 411 identifies the user corresponding to the event and acquires print setting items and a default print setting for the user from the print server 500 (this default print setting is the current print setting). The print setting item refers to "Single side/Double side" "Color/Monochrome". "N in 1", or the like in general but is not limited thereto. For example, the print setting item may also include an item used for setting whether or not to use the staple process if a staple function is provided to the printer 200 associated with the user or an item used for setting whether or not to use punch if a punch function is provided. Such information for each user is managed not in the print bot server 400 but in the print file storage 512 of the print server 500. Thus, the bot service 411 is required to acquire such information from the print server 500. Note that such information for each user may be managed in the print bot server 400.

Next, the bot service 411 stores the default print setting acquired in S1202 described above in the bot file storage 412 (S1203).

Next, the bot service 411 determines whether or not preview display is necessary in the massage to be generated (S1204). This is determined in accordance with whether or not the print setting was changed in the past in the case of a configuration that provides preview display only when the print setting is changed as described with FIG. 8, for example. Further, it may be determined to display no preview if the current print setting matches the default print setting but display a preview only if the current print setting does not match the default print setting. Then, if it is determined that preview display is necessary (S1204, Yes), the bot service 411 proceeds with the process to S1207.

In S1207, the bot service 411 transmits the current print setting described above to the print server 500 and acquires a preview image corresponding to the print setting. Then, in S1208, the bot service 411 stores the acquired preview image in the bot file storage 412 in association with the print setting described above. Next, in S1209, the bot service 411 generates a message including the preview image, the control used for print setting selection, and the "Print" button and proceeds with the process to S1206.

On the other hand, if it is determined that preview display is unnecessary (S1204, No), the bot service 411 proceeds with the process to S1205. In S1205, the bot service 411 generates a message including only the control used for print setting selection and the "Print" button and proceeds with the process to S1206. Note that information on a link to a file corresponding to the generated message may be included.

In S1206, the bot service 411 transmits the message generated in S1206 or S1209 described above to the message application server 300. In this step, the bot service 411 associates the identifier of the transmitted message with the print setting described above and the information on the link to a file stored in association with the identifier of a message corresponding to the "Yes" button press notification described above. The bot service 411 then returns to a standby state for a next event.

Figure 13:
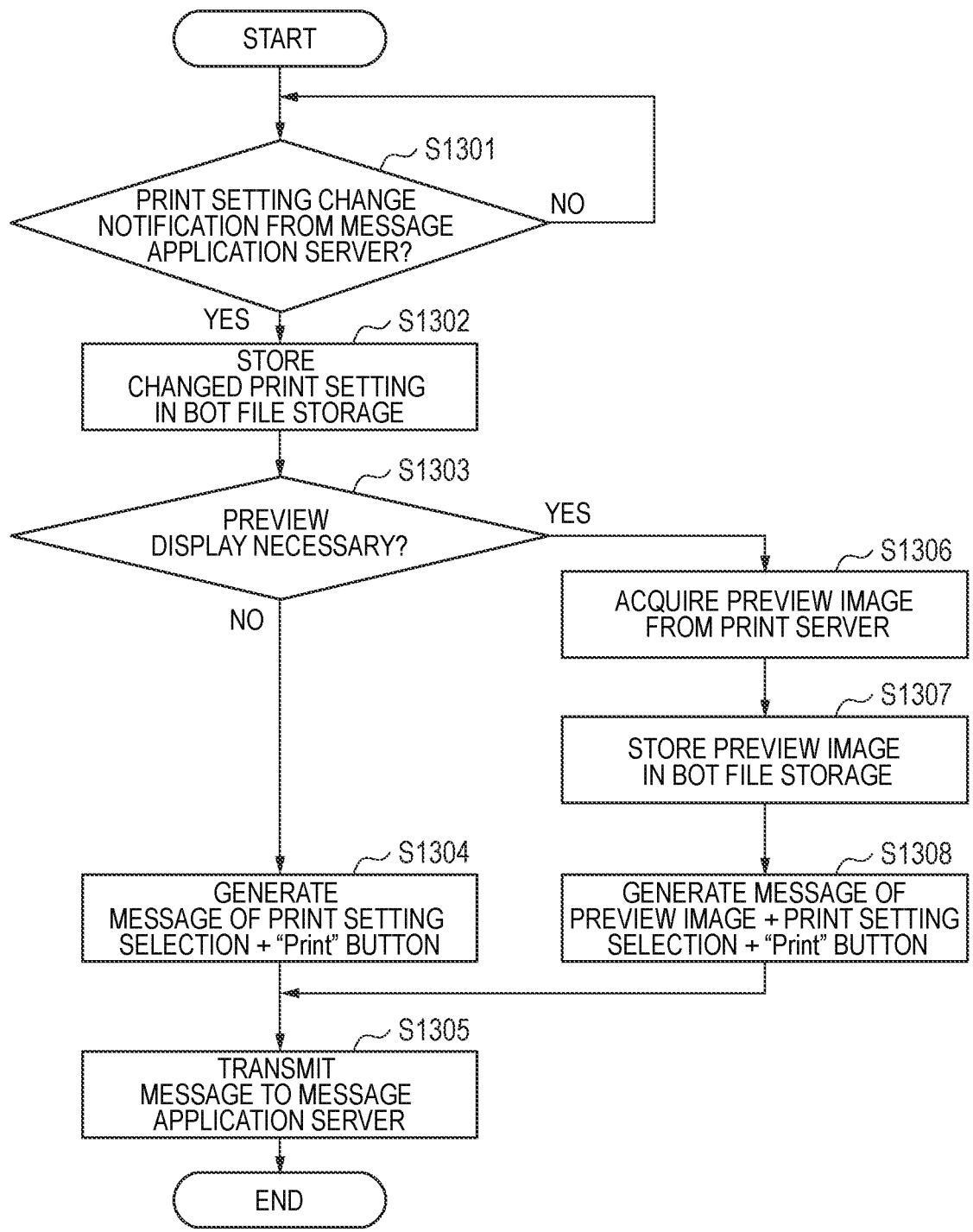
FIG. 13 is a flowchart illustrating a process of the bot service.

Next, the flowchart of FIG. 13 will be described. In response to receiving an event, the bot service 411 checks whether or not the event is a print setting change notification from the message application server 300 (S1301). Specifically, it is checked whether or not the event is an action notification when a combo box for the print setting change is operated. If the event is the print setting change notification (S1301, Yes), the bot service 411 proceeds with the process to S1302. Note that the print setting change notification includes an identifier of a message including the combo box in addition to the information on the action when the combo box for the print setting change is operated as described above.

In S1302, the bot service 411 identifies a changed print setting based on the information on the action included in the print setting change notification and stores the changed print setting in the bot file storage 412. In this step, the bot service 411 associates the changed print setting stored in S1302 described above (this print setting is the current print setting) instead of the print setting associated with the identifier of the message including the combo box described above.

The bot service 411 then determines again whether or not preview display is necessary in a message to be generated (S1303). Then, since the processes of S1304, S1306, S1307, and S1308 corresponding to the flow before the bot service 411 generates a message are the same as the processes of S1205, S1207, S1208, and S1209 described above, respectively, the description thereof will be omitted.

After generating (regenerating) the message in S1304 or S1308 described above, the bot service 411 transmits the generated message to the message application server 300 (S1305). In this step, the bot service 411 does not transmit an additional message but transmits an instruction to overwrite a message by using the identifier of the message existing before the print setting was changed. Accordingly, it is possible to realize an operation in which the message 603 of FIG. 6 and the message 803 of FIG. 8 are replaced with the message 703 of FIG. 7 at the same time as a change of the print setting. By doing so, it is possible to obtain an advantageous effect of avoiding wasting the message area on the client computer 100.

Figure 14:
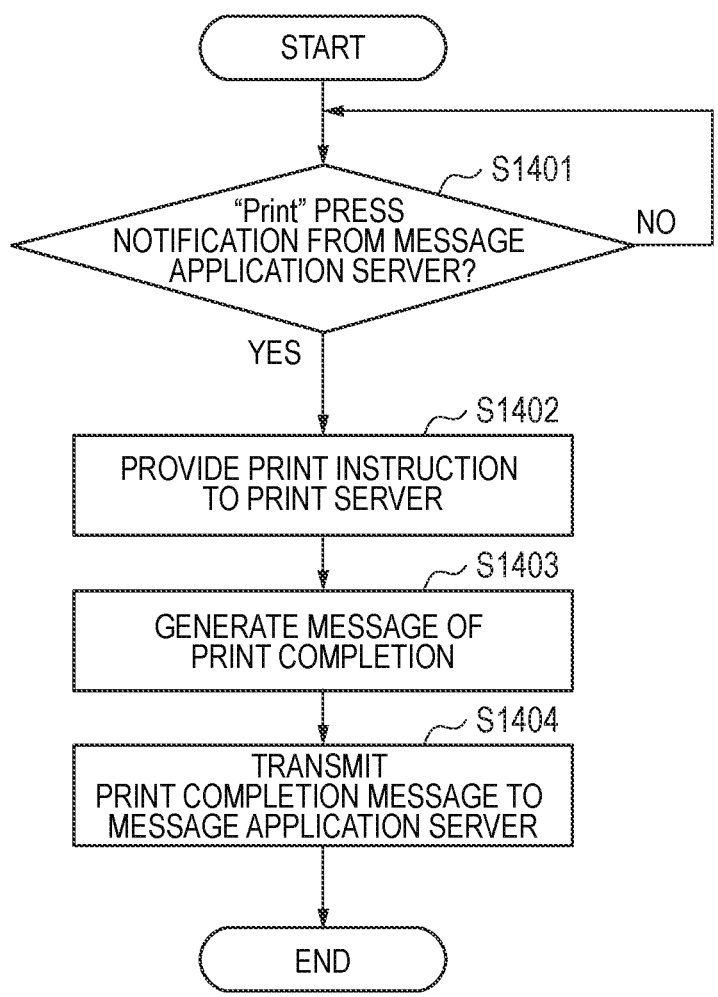
FIG. 14 is a flowchart illustrating a process of the bot service.

Next, the flowchart of FIG. 14 will be described. In response to receiving an event, the bot service 411 checks whether or not the event is an action caused by a "Print" button press notification from the message application server 300 (S1401). If the event is the action caused by the "Print" button press notification (S1401, Yes), the bot service 411 proceeds with the process to S1402. Note that the "Print" button press notification includes an identifier of a message including the "Print" button in addition to the information on the action when the "Print" button is pressed.

In S1402, the bot service 411 instructs the print server 500 to perform printing. In this step, the bot service 411 notifies the print server 500 of the print setting (current print setting) associated with the identifier of the massage including the "Print" button described above and the information on the link to the file. The bot service 411 then generates a print completion message (S1403) and transmits the print completion message to the message application server 300 (S404).

Figure 15:
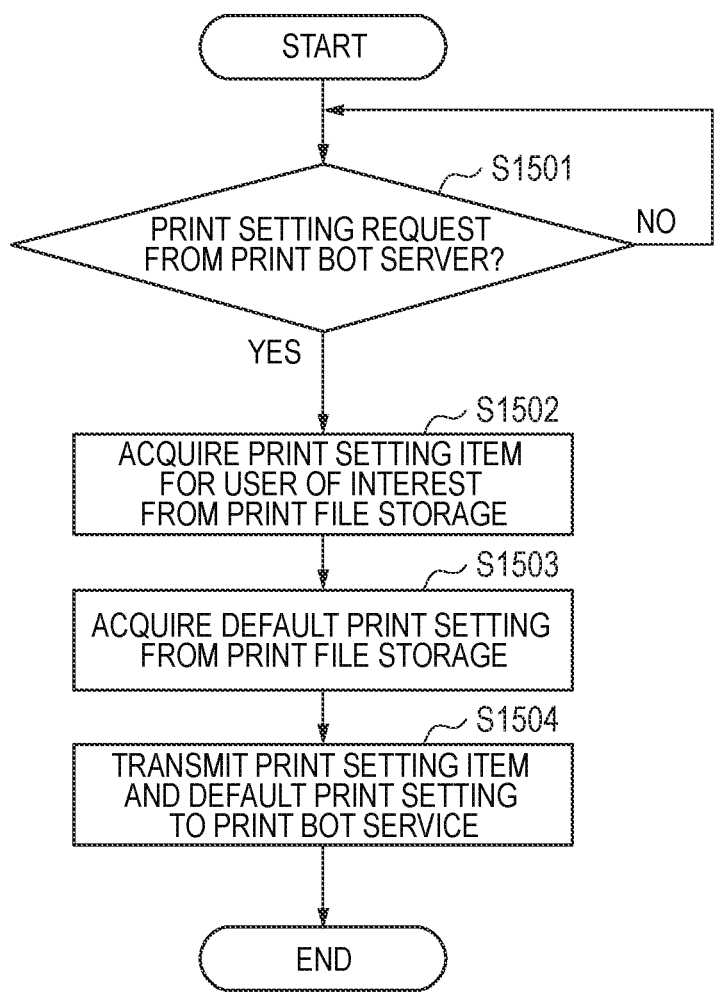
FIG. 15 is a flowchart illustrating a process of a print service.
Figure 16:
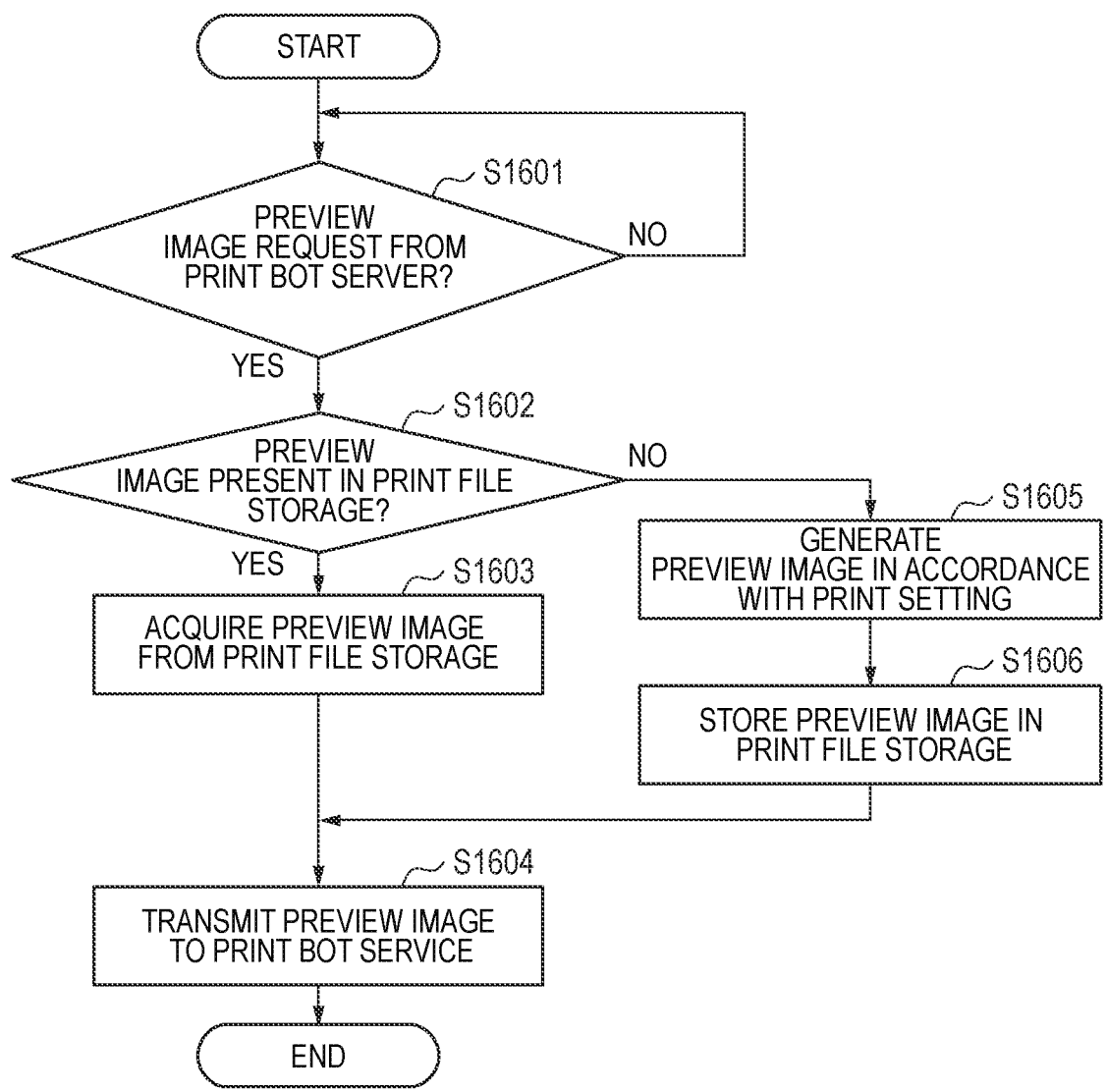
FIG. 16 is a flowchart illustrating a process of the print service.
Figure 17:
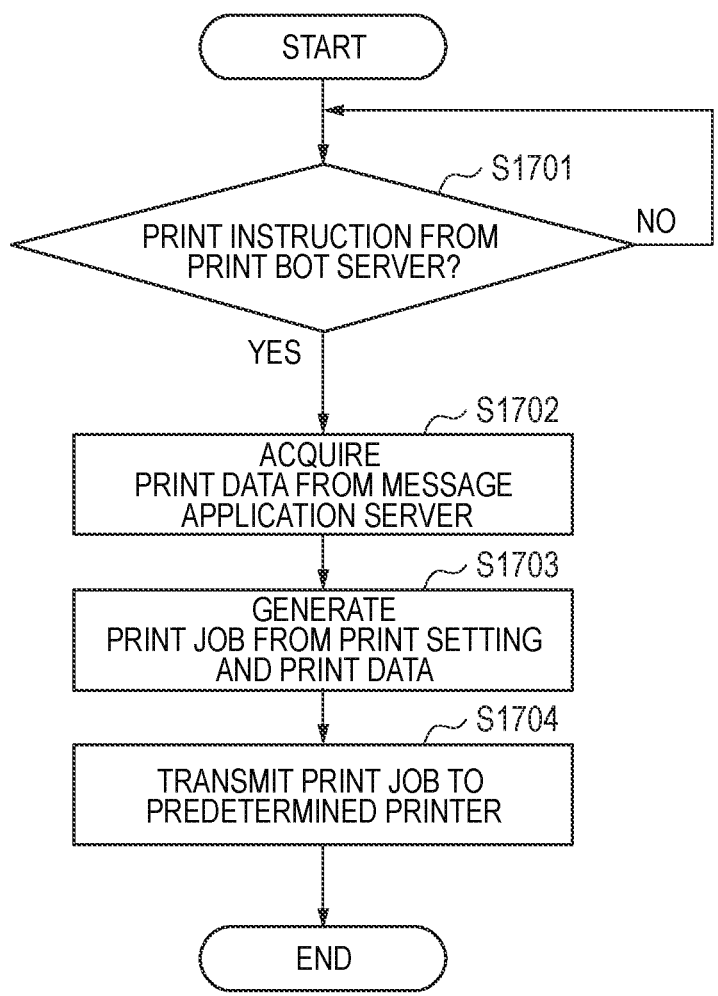
FIG. 17 is a flowchart illustrating a process of the print service.

Next, the process performed by the print service 511 will be described. FIG. 15 to FIG. 17 are flowcharts of the processes performed by the print service 511 on the print server 500. Each process illustrated in FIG. 15 to FIG. 17 is performed when a program of the print service 511 stored in the storage unit 503 of the print server 500 is loaded into the memory 506 and executed by the CPU 505. In the following, the process performed by the CPU 505 based on the program of the print service 511 will be described as the print service 511 being a subject of execution.

First, the flowchart of FIG. 15 will be described. The print service 511 monitors acquisition of an event and, in response to receiving an event, checks whether or not the event is a print setting request from the print bot server 400 (S1501). If the event is a print setting request from the print bot server 400 (S1501, Yes), the print service 511 proceeds with the process to S1502. Note that user information is included in the print setting request.

In S1502, the print service 511 acquires print setting items for the user from the print file storage 512. Furthermore, in S1503, the print service 511 acquires a default print setting corresponding to the print setting item for the user acquired in S1502 described above. The print file storage 512 stores information on all the users who use the print service 511, which includes configuration information of the printer 200 used by the user, necessary print setting items, a default print setting, and the like. Next, the print service 511 transmits the print setting item and the default print setting acquired in S1502 and S1503 described above to the bot service 411 (S1504).

Next, the flowchart of FIG. 16 will be described. The print service 511 monitors acquisition of an event and, in response to receiving an event, checks whether or not the event is a preview image request from the print bot server 400 (S1601). If the event is a preview image request from the print bot server 400 (S1601, Yes), the print service 511 proceeds with the process to S1602.

In S1602, the print service 511 checks whether or not a preview image of the corresponding print setting is present in the print file storage 512 (S1602). If the preview image of the corresponding print setting is present (S1602, Yes), the print service 511 proceeds with the process to S1603. In S1603, the print service 511 acquires the preview image from the print file storage 512 and proceeds with the process to S1604.

On the other hand, if the preview image of the corresponding print setting is not present (S1602, No), the print service 511 proceeds with the process to S1605. In S1605, the print service 511 dynamically generates a preview image in accordance with the print setting. The print service 511 then stores the generated preview image in the print file storage 512 (S1606) and proceeds with the process to S1604. The preview image is a preview image reflecting a print setting such as double side or N in 1, and there are enormous variations in accordance with combinations of settings. Although the description is omitted here, when it is difficult to prepare preview pages for all the combinations of aspects of sheet sizes in advance, orientations of printing, place of staple process, the number of punch holes, and the like, dynamic generation or use of a preview image as described above may simplify preparation or save storage.

In S1604, the print service 511 transmits the preview image acquired in S1603 or generated in S1605 described above to the bot service 411.

Next, the flowchart of FIG. 17 will be described. The print service 511 monitors acquisition of an event and, in response to receiving an event, checks whether or not the event is a print instruction from the print bot server 400 (S1701). If the event is a print instruction from the print bot server 400 (S1701, Yes), the print service 511 proceeds with the process to S1702. Note that the print instruction from the print bot server 400 includes a print setting and information on a link to a file to be printed.

In S1702, the print service 511 uses the information on the link to a file specified in the print instruction described above to acquire the file as print data from the message application server 300. In the example of FIG. 6, since the PDF file uploaded by the user is stored in the message file storage 312 of the message application server 300, the PDF file is acquired.

Next, the print service 511 generates a print job by using the print data acquired in S1702 described above and the print setting specified in the print instruction described above (S1703). The print job is data created in a data format called the page description language (PDL) in general and transmitted to the printer 200 to perform a print process. The print service 511 then transmits the print job generated in S1703 described above to the predetermined printer (S1704).

A message generated by the bot service 411 will be described here. FIG. 18 and FIG. 19 are diagrams each illustrating an example of the message generated by the bot service 411.

Figure 11:
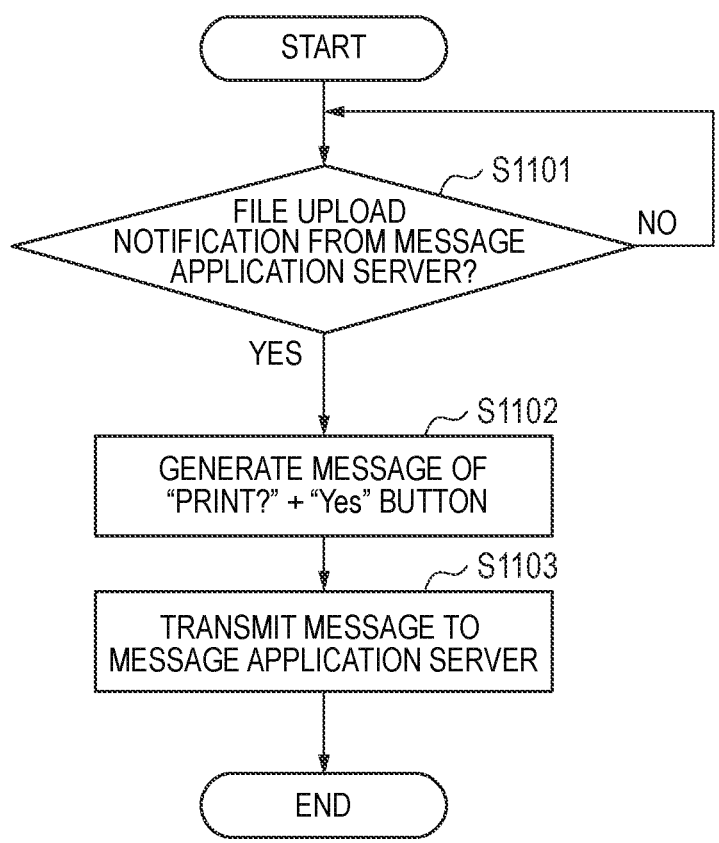
FIG. 11 is a flowchart illustrating a process of a bot service.

FIG. 18 corresponds to a message generated in S1102 of FIG. 11. The message is expressed in the JSON format, is formed and displayed as the message 602 of FIG. 6 by the messaging application 111 operating on the client computer 100, and thereby becomes visible to the user.

The first "blocks" indicates that the message consists of two blocks. The first block denotes "section" indicating a character string of "Print?", and the second block indicates a button with a character string "Yes". The button is an element of "actions", and in response to the button being pressed by the user, an action or the like are transmitted to the message application server 300 together with the character string of "yes" described in "value" (corresponding to S914 of FIG. 9).

Figure 12:
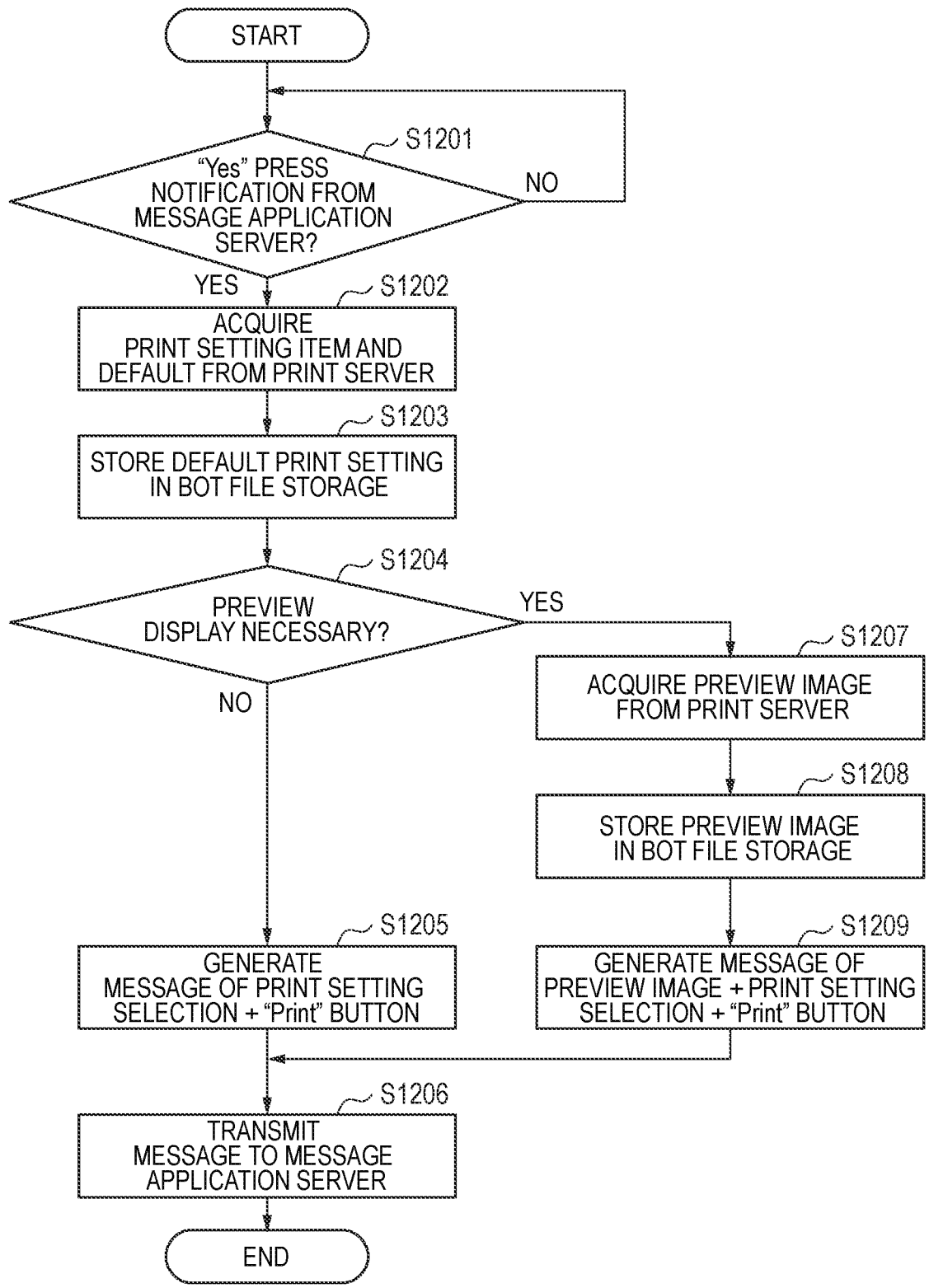
FIG. 12 is a flowchart illustrating a process of the bot service.

FIG. 19 corresponds to a message generated in S1209 of FIG. 12. This message is expressed in the JSON format, is formed and displayed as the message 603 of FIG. 6 by the messaging application Ill operating on the client computer 100, and thereby becomes visible to the user.

While this message consists of two "blocks" in the same manner as the message of FIG. 18, a view image is provided to "section" indicating the character string of the first block in a form of "accessory". This view image indicates a preview image in the present embodiment. The preview image is embedded in a message in a form of a URL, and the messaging application 111 acquires an image from a location specified by the URL and displays the image within the message.

In the second block "actions", a combo box of "Single side/Double side" and a button of "Print" are described as a form of alignment. Although description for a combo box such as "Color/Monochrome" or the like is required in the actual implementation, the description will be omitted here. The same applies for the feature that an action or the like are transmitted to the message application server 300 together with the respectively described character string of "value" regardless of a user operation of a combo box or a user operation of a button.

As set forth, because each application or service operates as described above, the user is able to check a format in accordance with a specified print setting on the messaging application 111 in advance. Accordingly, a print preview image of a file to be printed can be easily confirmed, a waste of paper due to unexpected output is avoided, and therefore convenience is improved.

Note that the function among the servers in the present embodiment is a mere example. For example, even when the details described as a process performed by the print server 500 are implemented as a process performed by the print bot server 400, the same advantageous effect can be obtained.

Second Embodiment

In the first embodiment, the example of arranging only a single preview image within a message has been described. In the second embodiment, a configuration for displaying a plurality of preview images within a message will be described, and the advantageous effect obtained thereby will be described. Note that only the difference from the first embodiment will be described here. Since the system configuration, the hardware/software configuration, and respective process flows are the same as those of the first embodiment except for a part thereof, the description thereof will be omitted.

Figure 20:
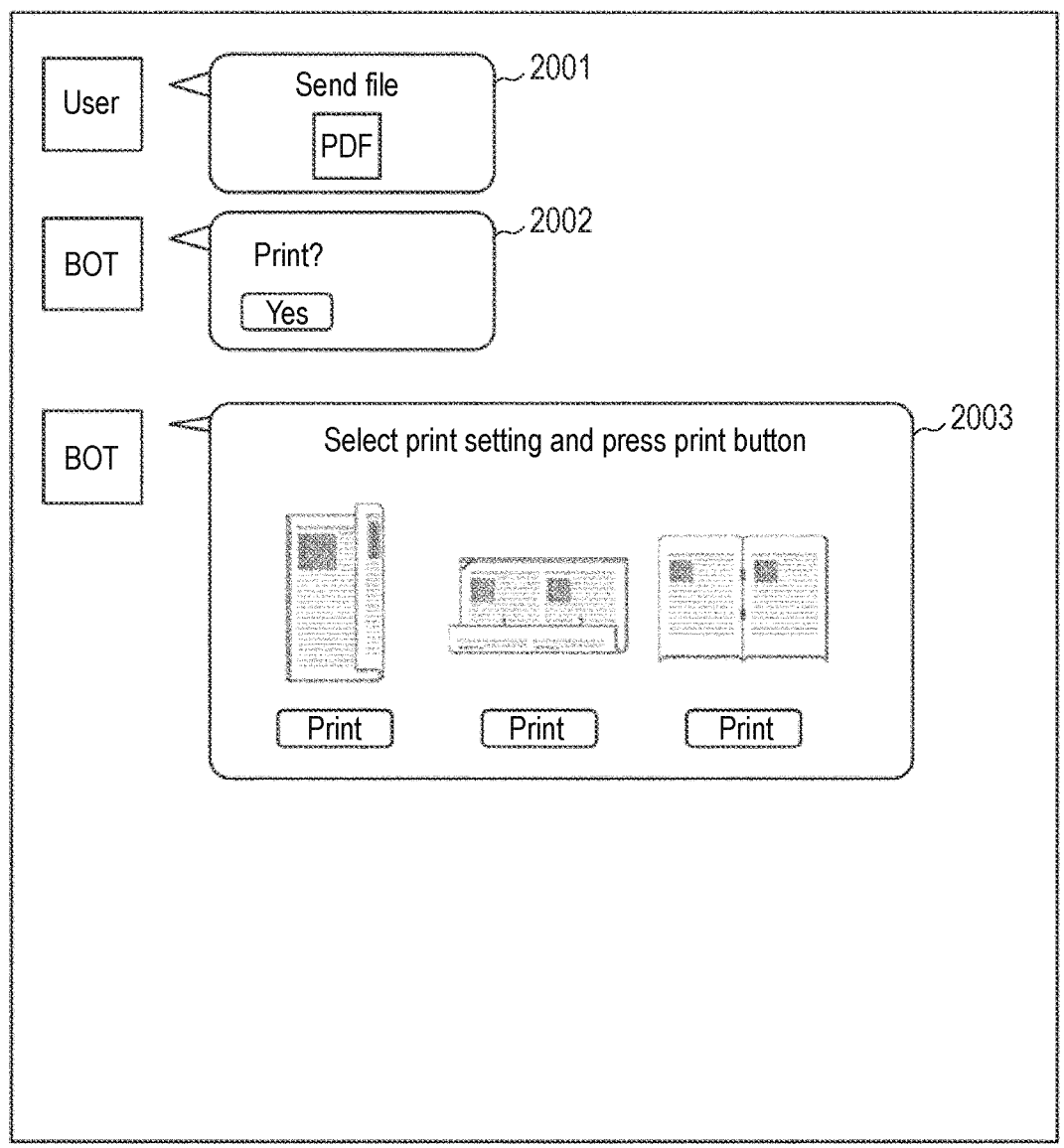
FIG. 20 is a diagram illustrating a user interface of a messaging application in a second embodiment.

FIG. 20 is a diagram illustrating a user interface of the messaging application 111 on the client computer 100 in the second embodiment, for example. Since a message 2001 and a message 2002 are the same as the message 601 and the message 602 of FIG. 6 in the first embodiment, the description thereof will be omitted.

The bot service 411 presents a plurality of preview images to the user in a message 2003. In the example of FIG. 20, three preview images of "1 in 1+Double side", "2 in 1+Double side+Staple on left-upper", and "Bookbinder+Saddle-stitch" are arranged, and respective "Print" buttons are arranged under the preview images. The user is able to provide a print instruction with a desired print setting by selecting a preview image with a print setting for intended printing and pressing the "Print" button under the selected preview image.

Next, the process of respective services in the second embodiment will be described with reference to FIG. 21 to FIG. 23. Only the process specific to the second embodiment will be described here, and the description of the same process as that in the first embodiment will be omitted.

Figure 21:
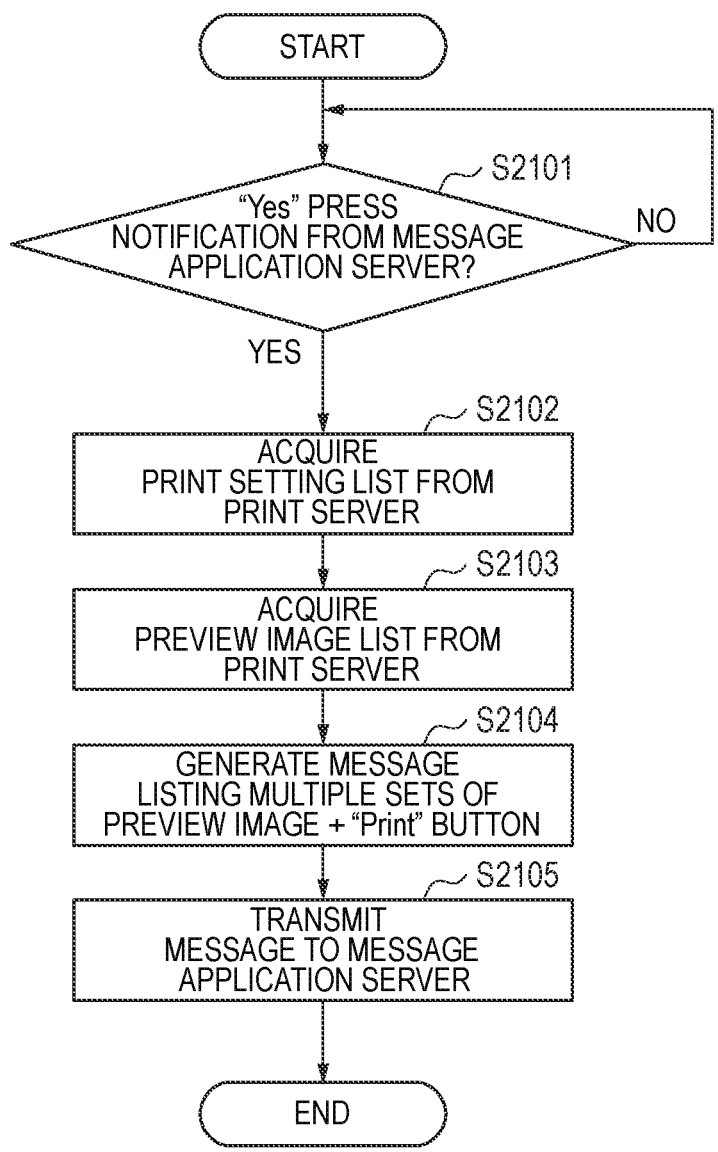
FIG. 21 is a flowchart illustrating a process of a bot service in the second embodiment.

FIG. 21 is a flowchart of the process performed by the bot service 411 on the print bot server 400 in the second embodiment. The process illustrated in FIG. 21 is performed when a program of the bot service 411 stored in the storage unit 403 of the print bot server 400 is loaded into the memory 406 and executed by the CPU 405.

In response to receiving an event, the bot service 411 checks whether or not the event is a "Yes" button press notification from the message application server 300 (S2101). If the event is a "Yes" button press notification from the message application server 300 (S2101, Yes), the bot service 411 proceeds with the process to S2102. Note that the "Yes" button press notification includes information that identifies the user who pressed the "Yes" button and an identifier of the message including the pressed "Yes" button.

In S2102, the bot service 411 identifies the user corresponding to the event and acquires a print setting list for the user from the print server 500. The print setting list refers to a list of print settings such as "1 in 1, Double side", "2 in 1. Double side+Staple on left-upper", or "Bookbinder+Saddle-stitch" described above. Such information for each user is managed not in the print bot server 400 but in the print file storage 512 in the print server 500. Thus, the bot service 411 is required to acquire such information from the print server 500. Note that such information for each user may be managed in the print bot server 400.

Next, the bot service 411 acquires a preview image list for the user from the print server 500 (S2103). The preview image list is a list of preview images corresponding to the print setting list described previously. The print setting corresponds to the preview image in a one-to-one manner, and the bot service 411 acquires preview images for the number of print settings.

The bot service 411 then uses the preview image list acquired in S2103 described above to generate a message listing multiple sets of preview image and "Print" button (S2104). The bot service 411 then transmits the message generated in S2104 described above to the message application server 300 (S2105). In this step, the bot service 411 associates the identifier of the transmitted message with the print setting acquired in S2102 described above and the information on the link to a file stored in association with the identifier of a message corresponding to the "Yes" button press notification described above.

In accordance with the process described above, it is possible to display the message illustrated in 2003 of FIG. 20 on the messaging application 111 of the client computer 100.

Figure 22:
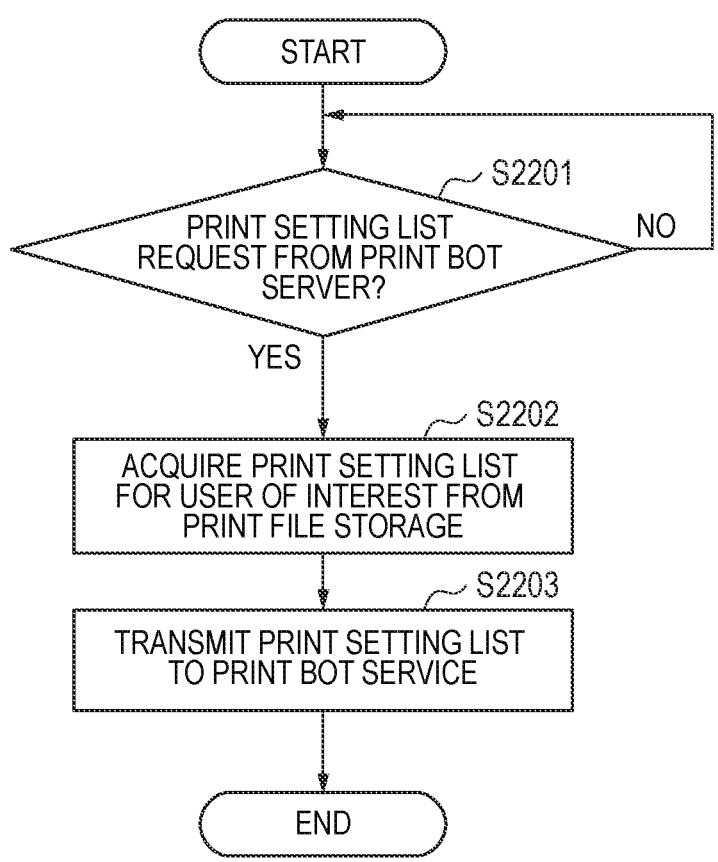
FIG. 22 is a flowchart illustrating a process of a print service in the second embodiment.
Figure 23:
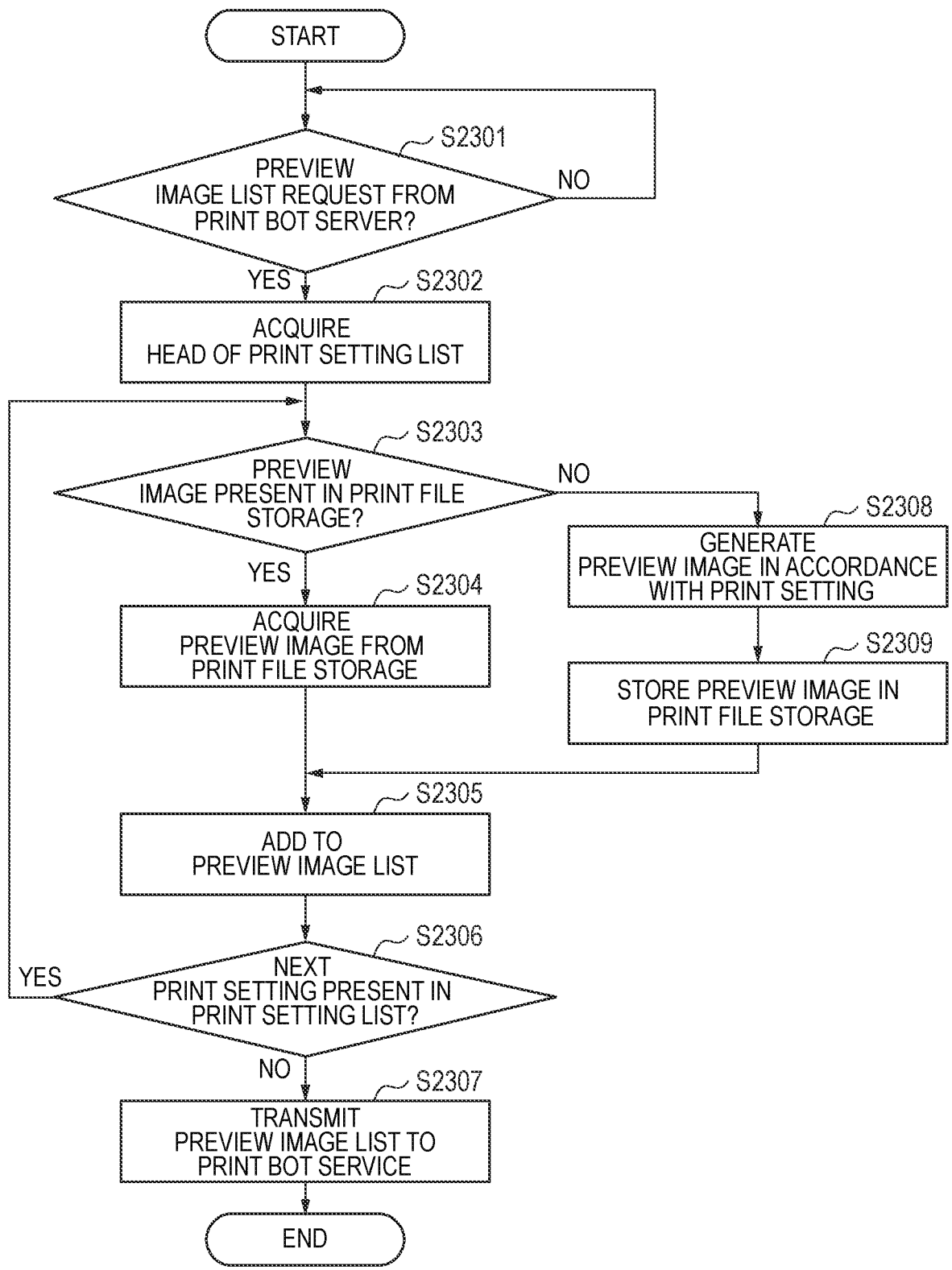
FIG. 23 is a flowchart illustrating a process of the print service in the second embodiment.

FIG. 22 and FIG. 23 are diagrams illustrating flowcharts of the processes performed by the print service 511 on the print server 500 in the second embodiment. Each process illustrated in FIG. 22 and FIG. 23 is performed when a program of the print service 511 stored in the storage unit 503 of the print server 500 is loaded into the memory 506 and executed by the CPU 505.

Note that, when receiving a "Print" button press notification from the message application server 300, the bot service 411 acquires a print setting corresponding to the "Print" button from a print setting list associated with an identifier of a message including the pressed "Print" button. Further, the bot service 411 acquires information on a link to a file associated with the identifier of the message. The bot service 411 then notifies the print server 500 of the acquired print setting and the information on the link to the file described above. The bot service 411 then generates and transmits a print completion message to the message application server 300.

First, the flowchart of FIG. 22 will be described. In the same manner as described in the first embodiment, the print service 511 monitors acquisition of an event and, in response to receiving an event, checks whether or not the event is a print setting list request from the print bot server 400 (S2201). If the event is a print setting list request from the print bot server 400 (S2201, Yes), the print service 511 proceeds with the process to S2202. Note that user information is included in the print setting list request.

In S2202, the print service 511 acquires a print setting list for the user from the print file storage 512. While a method of creating the print setting list is omitted, a preset print setting list may be used, or a print setting list customized on a user basis, dynamically generated, or the like may be applied. Next, the print service 511 transmits the print setting list acquired in S2202 described above to the bot service 411 (S2203).

Next, the flowchart of FIG. 23 will be described. In response to receiving an event, the print service 511 checks whether or not the event is a preview image list request from the print bot server 400 (S2301). If the event is a preview image list request from the print bot server 400 (S2301, Yes), the print service 511 proceeds with the process to S2302. Note that user information is included in the preview image list request.

In S2302, the print service 511 acquires a print setting located at the head of the print setting list for the user. Then, in S2303, the print service 511 checks whether or not a preview image corresponding to the print setting is present in the print file storage 512. If the preview image corresponding to the print setting is present (S2303, Yes), the print service 511 proceeds with the process to S2304. In S2304, the print service 511 acquires the preview image from the print file storage 512 and proceeds with the process to S2305.

On the other hand, if the preview image corresponding to the print setting is not present (S2303, No), the print service 511 proceeds with the process to S2308. In S2308, the print service 511 generates a preview image in accordance with the print setting. Since the method of generation is the same as that described in the first embodiment, the description thereof will be omitted. Then, in S2309, the print service 511 stores the preview image generated in S2308 described above in the print file storage 512 and proceeds with the process to S2305.

In S2305, the print service 511 adds the preview image to the preview image list being created.

Next, the print service 511 determines whether or not a next print setting is present in the print setting list for the user of interest (S2306). If the next print setting is present in the print setting list (S2306, Yes), the print service 511 acquires the next print setting and returns to the process to S2303.

On the other hand, if the next print setting is not present in the print setting list (S2306, No), the print service 511 proceeds with the process to S2307. That is, the process proceeds to S2307 when preview images corresponding to all the print settings in the print setting list have been added to the preview image list.

In S2307, the print service 511 transmits the preview image list generated in S2302 to S2306 described above to the bot service 411.

FIG. 24 is a diagram illustrating an example of a message generated by the bot service 411 in S2104 of FIG. 21 in the second embodiment. This message is expressed in the JSON format in the same manner as in the first embodiment, is formed and displayed as the message 2003 of FIG. 20 by the messaging application 111 operating on the client computer 100, and thereby becomes visible to the user. Note that, for simplified illustration, a case where the number of print setting lists is two is illustrated here as an example.

The first "blocks" indicates that the message consists of three blocks. The first block denotes "section" indicating a character string of " . . . press print button", the second block indicates an area related to the first print setting, and the third block indicates an area related to the second print setting. In each area related to the print setting, a preview image and a button with a character string of "Print" are illustrated.

A portion of the preview image is embedded in a message in a form of a URL in the same manner as in the first embodiment, and the messaging application 111 acquires an image from a location specified by the URL and displays the image within the message. Since the process for the "Print" button is the same as that for other buttons, the description thereof will be omitted.

As set forth, the second embodiment that displays a plurality of preview images within a message has been described. According to the second embodiment, since the user is able to view previews in a plurality of print settings at once, the convenience is enhanced compared to the first embodiment that dynamically changes preview images while changing print settings. Since the user is able to provide a print instruction only with one click on a "Print" button under a desired preview image, an advantageous effect of a reduction in the number of times of click, that is, a reduction in an effort of operation can also be obtained.

Third Embodiment

Both the first embodiment and the second embodiment have described an example using one or more simple preview images (one or more preview images each representing a format of an output result) that reflects a print setting. These preview images can be generated and displayed without depending on the content of print data and thus can be used for multiple purposes. From only the simple preview image, however, it is not easy to recognize how many sheets are actually output, which page is printed on the back of which pages in the actual data, or the like. Accordingly, this may be further advanced to enable confirmation of a real preview image in advance that reflects actual print data.

Specifically, the print service 511 acquires print data from the message application server 300 when generating a preview image in accordance with a print setting. The print service 511 then converts the print data into image data and generates a real preview image with a layout in a format that would be obtained when printed in a specified print setting. The bot service 411 incorporates a real preview image generated in such a way in a message and generates the message, and it is thereby possible to present a real preview image to the user prior to printing in the same method as that in the first embodiment or the second embodiment. Note that, since other processes are substantially the same as those in the first embodiment and the second embodiment, the description thereof will be omitted.

As illustrated above, in each embodiment, a bot service in cooperation with a messaging service generates a print setting selection message including a preview image. Accordingly, when performing printing by using the bot service on the messaging service, the user is able to confirm a format of an output result on the messaging application in advance before providing a print instruction. Thus, the user may easily confirm a print preview image of a file to be printed, and it is possible to reduce occurrence of printing in an unintended format. As a result, it is possible to reduce an effort for reprinting or a waste of print materials and construct an easy-to-use printing system. That is, the bot service generates and submits a print setting selection message including a preview image to a business chat, and this enables the user to confirm the format of a print result on the business chat in advance when performing printing by using the bot service on the business chart.

Note that the configuration of various data and the content thereof described above are not limited thereto and may be configured in various configurations or with various contents in accordance with a use or a purpose. As set forth, although illustration has been made for each embodiment, the present invention can take an embodiment as a system, an apparatus, a method, a program, a storage medium, or the like, for example. Specifically, the present invention may be applied to a system formed of a plurality of devices or may be applied to an apparatus formed of a single device. Further, all the configurations in combination of the embodiments described above are also included in the present invention.

According to the present invention, a user is able to confirm a format of an output result on a messaging application in advance before providing a print instruction, and it is possible to reduce occurrence of printing in an unintended format. As a result, it is possible to reduce an effort for reprinting or a waste of print materials and construct an easy-to-use printing system.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-007358, filed Jan. 21, 2020, which is hereby incorporated by reference herein in its entirety.

What is claimed is:

1. An information processing apparatus in cooperation with a messaging service that controls transfer of a message with a messaging application operating on a client terminal, the information processing apparatus comprising:
a generation unit that generates a message including a control for specifying a print setting of a file submitted from the messaging application to the messaging service and a preview image corresponding to a print setting specified by the control;

a submission unit that submits the message generated by the generation unit to the messaging service; and a control unit that controls printing of the file using the print setting specified by the control in response to a print instruction for the file received from the messaging service, wherein when the generation unit received, from the messaging service, a notification indicating that specification of the print setting was changed by the control included in the submitted message, the generation unit regenerates the message in accordance with the changed print setting, and wherein the submission unit updates the submitted message with a message regenerated by the generation unit.

2. The information processing apparatus according to claim 1, wherein when the print setting specified by the control included in the generated message is a predetermined print setting, the generation unit does not include the preview image in the message.

3. An information processing apparatus operating in cooperation with a messaging service that controls transfer of a message with a messaging application operating on a client terminal, the information processing apparatus comprising:

a generation unit that generates a message including one or more preview images corresponding to one or more print settings and a control for printing a file, submitted to the messaging service, using one of the one or more print settings;

a submission unit that submits the message generated by the generation unit to the messaging service; and a control unit that controls printing of the file using the one print setting in response to a print instruction for the file received from the messaging service.

4. The information processing apparatus according to claim 3, wherein each one of the one or more preview images is an image indicating a format of a print result corresponding to one of the one or more print settings.

5. The information processing apparatus according to claim 3, wherein each one of the one or more preview images is an image indicating an actual print result of the file printed based on one of the one or more print settings.

6. The information processing apparatus according to claim 3, wherein the information processing apparatus is configured to cooperate with a print service that transmits a print job to a printing apparatus, and wherein the control unit instructs the print service to print the file using the print setting.

7. The information processing apparatus according to claim 6 further comprising an acquisition unit that acquires the one or more preview images from the print service.

8. The information processing apparatus according to claim 7, wherein the one or more preview images are generated by the print service in response to a request from the acquisition unit.

9. A non-transitory storage medium that stores a program that causes a computer to function as each unit according to claim 3.

10. The information processing apparatus according to claim 3, wherein the one or more preview images respectively correspond to one or more print settings.

11. The information processing apparatus according to claim 3, wherein the control is a print button.

12. The information processing apparatus according to claim 3, wherein the controlling of the printing is generating print data based on the file.

13. A control method for generating a message to be submitted to a messaging service, the method comprising:

generating the message including one or more preview images corresponding to one or more print settings and a control for printing a file, submitted to the messaging service, using one of the one or more print settings;

submitting the generated message to the messaging service; and controlling printing of the file using the one print setting in response to a print instruction for the file received from the messaging service.

14. The method according to claim 13, wherein each one of the one or more preview images is an image indicating a format of a print result corresponding to one of the one or more print settings.

15. The method according to claim 13, wherein each one of the one or more preview images is an image indicating an actual print result of the file printed based on one of the one or more print settings.

16. The method according to claim 13, wherein a print service is instructed to print the file using the print setting.

17. The method according to claim 16, further comprising acquiring the one or more preview images from the print service.

18. The method according to claim 17, wherein the one or more preview images are generated by the print service in response to a request.

19. The method according to claim 13, wherein the one or more preview images respectively correspond to one or more print settings.

20. The method according to claim 13, wherein the control is a print button.

21. The method according to claim 13, wherein the controlling of the printing is generating print data based on the file.

* * * * *